United States Patent [19]
Munter et al.

[11] Patent Number: 6,141,738
[45] Date of Patent: Oct. 31, 2000

[54] ADDRESS TRANSLATION METHOD AND SYSTEM HAVING A FORWARDING TABLE DATA STRUCTURE

[75] Inventors: Ernst A. Munter, Kanata; Gary Michael Depelteau, Ottawa, both of Canada

[73] Assignee: Nortel Networks Corporation, Montreal, Canada

[21] Appl. No.: 09/111,718

[22] Filed: Jul. 8, 1998

[51] Int. Cl.[7] ..................................................... G06F 12/00
[52] U.S. Cl. ........................ 711/206; 711/202; 711/216; 707/100; 370/389; 370/392; 370/400
[58] Field of Search ..................................... 711/203, 202, 711/206, 216; 707/100; 370/400, 389, 392

[56] References Cited

U.S. PATENT DOCUMENTS

| | | | |
|---|---|---|---|
| 5,386,413 | 1/1995 | McAuley et al. | 370/54 |
| 5,414,704 | 5/1995 | Spinney | 370/60 |
| 5,488,608 | 1/1996 | Flammer, III | 370/85.13 |
| 5,664,177 | 9/1997 | Lowry | 395/611 |

OTHER PUBLICATIONS

Degermark, Mikael et al., Small Forwarding Tables for Fast Routing Lookups, Department of Computer Science and Electrical Engineering, Luleå University of Technology, S–971 87 Luleå, Sweden.

Waldvogel, Marcel et al., Scalable High Speed IP Routing Lookups, Computer Engineering and Networks Laboratory, ETH Zürich, Switzerland; Computer and Communications Research Center, Washington University in St. Louis, USA.

*Primary Examiner*—Do Hyun Yoo
*Assistant Examiner*—Nasser Moazzami
*Attorney, Agent, or Firm*—Max R. Wood

[57] ABSTRACT

A forwarding table data structure and a memory optimization process that involves variable multi-stage lookups. The data structure for an address translation system includes, a plurality of blocks, each of the plurality of blocks includes a contiguous set of data records; each data record includes a pointer and an action indicator; if the action indicator is equal to a prescribed value the pointer represents an address of a translation target in the data structure; and if the action indicator is not equal to the prescribed value the pointer represents an address of a selected one of the plurality of blocks in the data structure. The data structure is built based on the input data set (e.g. IP routing table) to be memory optimized. The number of stages can be flexibly determined based on memory restrictions, input data set etc. Since the data structure is essentially "customized" optimal routing speeds can be obtained.

13 Claims, 25 Drawing Sheets

| 1 | 2 | 3 | ... | X-1 | X | ... | $2^A$ |
|---|---|---|-----|-----|---|-----|-------|
| [RI,0] | [0,0] | [Ptr,AI] | ... | [Ptr,AI] | [0,0] | [0,0] | [0,0] |

STAGE 1 FORWARDING TABLE 300

| 1 | 2 | 3 | ... | X-1 |
|---|---|---|-----|-----|
| [RI,0] | [0,0] | [Ptr,AI] | ... | [Ptr,AI] |

TRUNCATED STAGE 1 FORWARDING TABLE 302

FIG. 8

ADDRESS TRANSLATION METHOD AND SYSTEM HAVING A FORWARDING TABLE DATA STRUCTURE

FIELD OF THE INVENTION

This invention relates to the field of address translation as used in packet data communication networks, and more particularly to an address translation method and system having a forwarding table data structure.

BACKGROUND OF THE INVENTION

In data communication networks (Internet, ATM, Ethernet, token ring, and the like) address translation is an integral component of the system. In particular, there is a requirement of doing source and destination address lookups.

Using the Internet as a basis for discussion, three main factors contribute to the speed of traffic over the Internet: link speeds, router data throughput, and packet forwarding rates. Readily available solutions exist for the first two factors. For example, fiber-optics can provide faster links and switching technology can be used to move packets through a router at gigabit speeds. The present invention deals with the third factor, packet forwarding.

The most fundamental operation in any Internet Protocol (IP) routing product is the routing table search process. A packet is received with a specific destination address (DA), identified by a unique 32-bit field (in the current IP Version 4 implementation). The router must search a forwarding table using the IP DA as its key, and determine which entry in the table represents the best route for the packet to take in its journey across the network to its destination.

The search is made complex by the fact that entries in the table have variable lengths, and also that many entries may represent valid routes to the same destination. Unlike a simple search that seeks to find an exact match within a table, the routing table search algorithm must select the most specific route from a number of entries, i.e. the route that represents the longest network prefix for the given DA.

Specifically, a forwarding database in an IP router consists of a number of variable length network addresses. The length of the network address is given by a prefix length. When an IP router receives a packet, it must compute which of the network addresses in its database has the longest match when compared to the destination address in the packet. The packet is then forwarded to the output link associated with that prefix.

For example, a forwarding database may have the following network addresses (NA): NA1=0101, NA2=0101101 and NA3=010110101011. In this example the destination address is 16-bits long, the corresponding prefix mask values defines the network portion of the destination address: P1=1111000000000000, P2=1111111000000000 and P3=1111111111110000. An address whose first 12 bits are 010101101011 has longest matching prefix P1. An address whose first 12 bits are 010110101101 has longest matching prefix P2.

The route search operation is a very time-consuming operation, and typically defines the upper bound on the router's ability to forward packets. Many high speed routers augment the full-table search with a fast path process that performs an exact-match search in a small address cache, but must still default to the full-table search (the "slow path") for addresses not found in the cache.

Routing problems are escalating in view of data links now operating routinely at 600 Mbits/s (OC-12) that can generate over 1 million packets-per-second requiring routing. Further, new protocols, such as RSVP, require route selection based not only on destination address, but potentially also protocol number, source address, destination port and source port.

In addition, virtual networks, quality of service (QoS) guarantees, and layer four snooping (i.e., deriving routing criteria from layer 4, TCP, UDP etc. fields) will tend to increase the number of bits needed to be considered. Further, IP version 6 will increase the size of the address filed from 32 bits to 128 bits, with network prefixes up to 64 bits in length.

A popular algorithm used in routers is based on the Patricia Tree (Practical Algorithm to Retrieve Information Coded in Alphanumeric). The forwarding table that associates each prefix entry with an exit port and next-hop address is stored in a binary radix tree (BRT) form. The BRT is organized in a series of nodes, each of which contains a route of varying length, and each of which has two branches to subsequent nodes in the tree. At the ends of the branches are leaves, which either represent full 32-bit host routes (for devices attached directly to the router) or host-specific routes available to a particular subnet.

For example, a traditional implementation of Patricia trees for routing lookup purposes uses 24 bytes for leaves and internal nodes. With 40,000 entries (in a typical routing table), the resulting tree structure alone is almost 2 Mbytes, and in a perfectly balanced tree 15 or 16 nodes must be traversed to find a routing entry. In some cases, due to the longest matching prefix rule, additional nodes need to be traversed to find the proper routing information as it is not guaranteed that the initial search will find the proper leaf.

The Patricia Tree approach does not scale well to gigabit speeds. In particular, the data structure is too large and a worst-case lookup involves many memory accesses, taking far more time than is available to support gigabit rates.

Hashing is an alternative approach to searching that is used in some LAN switches and has been applied to routing table searches. In contrast to the Patricia Tree, hashing operates strictly on an exact-match basis, and assumes the number of IP DAs that the system must handle at any one time is limited to a few thousand. A hash function is a sort of compression algorithm that is used to condense each 32-bit host route (i.e., exact DA) in the table to a smaller-sized entry (8–10 bits typically).

Each host route maps to a unique location in a hash table, each entry in the hash table (termed a slot) corresponds to one or more host routes. The compression of hashing makes the table small enough to quickly search using simple hardware-based exact matching techniques.

When a packet is received, an equivalent hash value is computed quickly from its DA, and compared directly against all entries in the hash table. When a match is found, an exact match of the DA can be searched in the list of addresses for the hash slot. If the address is not found in either search, there is no match, and the packet must be sent to a CPU for software processing—its address must also be used to compute a new entry for the hash table.

The host-route hashing algorithm improves the average-case behaviour for small routing tables over the Patricia Tree. However, there continues to be a number of problems associated with host-route hashing. Since only host routes (i.e., full 32-bit addresses) are cached, the number of entries in the table grows linearly with the number of hosts on the network. This does not take advantage of the hierarchical address structure of IP, forcing tables to grow as rapidly as new users arrive on the Internet.

Another key disadvantage of storing host routes instead of network prefixes is the time required to update the routing table. Even a single network-level route change may require many host routes to be flushed from the table. This problem can be particularly severe for a very large hash table or in a backbone router, where multiple entries change after a routing update.

A multi-stage lookup method using a compact routing table is described in *Small Forwarding Tables for Fast Routing Lookups*, Degermark et al., http://www.cdt.luth.se/net/publications.html.

For the purpose of describing the small forwarding table data structure a representation of a binary tree 10 that spans the entire IP address space (Ipv4) is shown in FIG. 1. The height of the tree 10 is 32 bits, and the number of leaves is $2^{32}$, one for each possible IP address. The prefix of a routing table entry defines a path in the tree ending in a node. All IP addresses (leaves) in the subtree rooted at that node should be routed according to that routing entry. In this manner each routing table entry defines a range of IP addresses with identical routing information.

The forwarding table is a representation of the binary tree 10 spanned by all routing entries. This is called a prefix tree. The Degermark et al. data structure requires that the prefix tree be complete (i.e., that each node in the tree has either two or no children). A set of routing entries partitions the IP address into sets of IP addresses.

The binary tree 10 of FIG. 1 illustrates the three levels (16-8-8) of the data structure proposed by Degermark et al. In particular, level one of the data structure covers the prefix tree down to depth 16, level two covers depths 17 to 24, and level three depths 25–32. Wherever a part of the prefix tree extends below level 16, a level two section describes that part of the tree. Similarly, sections at level three describe parts of the prefix tree that are deeper than 24. The result of searching one level of the data structure is either an index into the next-hop table or an index into an array of sections for the next level.

The Degermark et al. forwarding tables can be built during a single pass over all routing entries in a routing table. However, there is no guarantee that the resulting forwarding tables are memory optimized since the source data set (i.e. the routing entries) vary widely over different routers and over different times within the same router.

SUMMARY OF THE INVENTION

An object of the present invention is to provide a data structure and an address translation method that improves translation/routing performance in a data communications system.

Another object of the present invention is to provide a method of building a data structure for forwarding tables in a data communications system.

Another object of the present invention is to provide a method of routing a packet having a destination address through a network using a forwarding table data structure.

Another object of the present invention is to provide a method of building a memory optimized data structure for forwarding tables.

In accordance with one aspect of the present invention there is provided a memory for storing data for access by an application program being executed on an address translation system, comprising:

a data structure stored in said memory, said data structure including information resident in a database used by said application program and including:

a plurality of blocks, each of the plurality of blocks includes a contiguous set of data records;

each data record includes a pointer and an action indicator;

if the action indicator is equal to a prescribed value the pointer represents an address of a translation target in the data structure; and if the action indicator is not equal to the prescribed value the pointer represents an address of a selected one of the plurality of blocks in the data structure.

In accordance with another aspect of the present invention there is provided an address translation system executing an application program and containing a routing table used by said application program, said address translation system comprising:

CPU means for processing said application program; and memory means for holding a data structure for access by said application program, said data structure being composed of information resident in said routing table used by said application program and including:

a plurality of objects, each of the plurality of objects includes a set of data records;

each data record includes a pointer and an action indicator;

if the action indicator is equal to a prescribed value the pointer represents an address of a translation target in the data structure; and if the action indicator is not equal to the prescribed value the pointer represents an address of a selected one of the plurality of objects in the data structure.

In accordance with another aspect of the present invention there is provided a method of translating an X-bit address to a resource index selected from a plurality of resource indices where $2^X$ exceeds the number of resource indices comprising the steps of:

(a) using a first bit offset value A representing A most significant bits of the X-bit address as a first offset into a first lookup table containing $2^A$ entries where each entry includes a pointer and an action indicator; said pointer represents (i) an address to one of a plurality of second lookup tables when the action indicator is greater than a prescribed value indicating that an address to a second level table is required and (ii) one of the plurality of resource indices when the action indicator is equal to the prescribed value indicating that the X-bit address has been translated;

(b) using the action indicator to determine a second bit offset value B representing B bits following the A most significant bits of the X-bit address; and (c) using the second bit offset B to select the next B bits following the A most significant bits of the X-bit address as a second offset to a selected second lookup table, the selected second table containing $2^B$ entries.

In accordance with another aspect of the present invention there is provided a method of creating a forwarding table data structure for access by an application program, said application program being executed by a data processor that creates said data structure in a memory coupled to the data processor, said forwarding table data structure being created from a routing table sorted in ascending order, said routing table including a plurality of route entries where each route entry contains a prefix representing an address, a prefix length (PL) and a resource index, and said method comprising the steps, executed by said data processor, of:

(a) selecting a width W for a first stage table;

(b) creating the first stage table of a size equal to $2^W$;

(c) reading a route entry from the routing table;

(d) computing an offset from the W first bits of the prefix of the route entry read at step (c);

(e) when the prefix length of the route entry is the same as the width W of the first stage table creating, a resource record containing the resource index of the route entry and an action indicator of zero and storing the resource record at the offset of the first stage table;

(f) when the prefix length of the route entry is less than the width W of the first stage table, creating a resource record containing the resource index of the route entry and an action indicator of zero and storing the record at the offset in the first stage table T0 and at $2^{W-PL}-1$ subsequent locations in the first stage table following the offset;

(g) when the prefix length of the route entry is greater than the width W of the first stage table selecting a width V for a second stage table, creating the second stage table of a size equal to $2^V$, creating a pointer record including a pointer to the second stage table and an action indicator equal to the width V of the second stage table, and storing the pointer record at the offset in the first stage table; and (h) returning to step (c) until each route entry in the routing table has been read once.

In accordance with another aspect of the present invention there is provided a method of creating a forwarding table data structure from a routing table sorted in ascending order, said routing table including a plurality of route entries where each route entry contains a prefix representing an address, a prefix length and a resource index; said method comprising the steps of:

(a) selecting a width W ($1 \leq W \leq N$) for a first stage table T0, where N is a maximum prefix length;

(b) creating the first stage table T0 of a size equal to $2^W$, (c) reading a route entry from the routing table;

(d) computing an offset A from the W first bits of the prefix of the route entry read at step (c);

(e) comparing the prefix length PL of the route entry with the width W of the first stage table T0;

(1) creating a resource record when the prefix length PL is equal to the width W, said resource record including the resource index RI of the route entry and an action indicator AI of 0; storing the resource record at the offset A in the first stage table T0; and returning to step (c) until each route entry in the routing table has been read once;

(2) creating a resource record when the prefix length PL is less than the width W, said resource record including the resource index RI of the route entry and an action indicator AI of 0; storing the resource record at the offset A in the first stage table T0 and at $2^{W-PL}-1$ subsequent locations in the first stage table T0 following the offset A; and returning to step (c) until each route entry in the routing table has been read once;

(3) selecting a width V for a second stage table Tx when the prefix length PL is greater than the width W and offset A in the first stage table T0 is empty; creating the second stage table Tx (x=1,2, . . . ) of a size equal to $2^V$; creating a pointer record including a pointer Ptr to the second stage table Tx and an action indicator AI equal to the width V of the second stage table Tx; storing the pointer record at the offset A in the first stage table T0; and computing an offset B from the next V bits of the prefix following the first W bits; proceeding to second stage processing at step (f);

(4) selecting a width V for a second stage table Tx when the prefix length PL is greater than the width W and offset A in the first stage table T0 contains a resource record; creating the second stage table Tx (x=1,2, . . . ) of a size equal to $2^V$; filling the second stage table Tx with the resource record from offset A of the first stage table T0; creating a pointer record including a pointer Ptr to the second stage table Tx and an action indicator AI equal to the width V of the second stage table Tx; storing the pointer record at the offset A in the first stage table T0; and computing an offset B from the next V bits of the prefix following the first W bits; proceeding to second stage processing at step (f);

(5) computing an offset B from the next V bits of the prefix following the first W bits when the prefix length PL is greater than the width W and offset A in the first stage table T0 contains a pointer record; and proceeding to second stage processing at step (f);

(f) comparing a first modified prefix length PL-W of the route entry with the width V of the second stage table Tx;

(1) creating a resource record when the first modified prefix length PL-W is equal to the width V, said resource record including the resource index RI of the route entry and an action indicator AI of 0; storing the resource record at the offset B in the second stage table Tx; and returning to step (c) until each route entry in the routing table has been read once;

(2) creating a resource record when the first modified prefix length PL-W is less than the width V, said resource record including the resource index RI of the route entry and an action indicator AI of 0; storing the resource record at the offset B in the second stage table Tx and at $2^{V-(PL-W)}-1$ subsequent locations in the second stage table Tx following the offset B; and returning to step (c) until each route entry in the routing table has been read once;

(3) selecting a width U for a third stage table Ty when the first modified prefix length PL-W is greater than the width V and offset B in the second stage table Tx is empty; creating the third stage table Ty (y=$x_{max}$+1, $x_{max}$+2, . . . ) of a size equal to $2^U$; computing an offset C from the next U bits of the prefix following the first W+V bits; creating a pointer record including a pointer Ptr to the third stage table Ty and an action indicator AI equal to the width U of the third stage table Ty; storing the pointer record at the offset C in the third stage table Ty; and; proceeding to third stage processing at step (g);

(4) selecting a width U for a third stage table Ty when the first modified prefix length PL-W is greater than the width V and offset B in the second stage table Tx contains a resource record; creating the third stage table Ty (y=$x_{max}$+1, $x_{max}$+2, . . . ) of a size equal to $2^U$; filling the third stage table Ty with the resource record from offset B of the second stage table Tx; computing an offset C from the next U bits of the prefix following the first W+V bits; creating a pointer record including a pointer Ptr to the third stage table Ty and an action indicator AI equal to the width U of the third stage table Ty; storing the pointer record at the offset C in the third stage table Ty; and; proceeding to third stage processing at step (g);

(5) computing an offset C from the next U bits of the prefix following the first W+V bits when the first modified prefix length PL−W is greater than the width V and offset B in the second stage table Tx contains a pointer record; and proceeding to third stage processing at step (g);

(g) comparing a second modified prefix length PL−W−V of the route entry with the width U of the third stage table Ty;

(1) creating a resource record when the second modified prefix length PL−W−V is equal to the width U, said resource record including the resource index RI of the route entry and an action indicator AI of 0; storing the resource record at the offset C in the third stage table Ty; and returning to step (c) until each route entry in the routing table has been read once;

(2) creating a resource record when the second modified prefix length PL−W−V is less than the width U, said resource record including the resource index RI of the route entry and an action indicator AI of 0; storing the resource record at the offset C in the third stage table Ty and at $2^{U-(PL'-W-V)}-1$ subsequent locations in the third stage table Ty following the offset C; and returning to step (c) until each route entry in the routing table has been read once.

In accordance with another aspect of the present invention there is provided a method wherein the step of selecting the width U of third stage tables, for given W, V, comprise the steps of:

(i) defining a sub-range as a group of prefixes in the routing table under W+V;

(ii) scanning the sub-range to find a longest prefix PL';

(iii) calculating a value for U as PL'−W−V; and (iv) calculating a memory requirement as MEMrqd(U)= $2^U$.

In accordance with another aspect of the present invention there is provided a method wherein the step of selecting the width V of second stage tables, for given W, comprise the steps of:

(i) defining a sub-range as a group of prefixes in the routing table under W;

(ii) scanning the sub-range to find a longest prefix PL';

(iii) initializing V=1, BEST(V)=1, BESTmem=$2^{(PL'-W)}$, where BEST(V) represents a value of V that memory optimizes the data structure, and BESTmem represents a value of memory required for a memory optimized data structure;

(iv) calculating a memory requirement as MEMrqd(V)= $2^V$;

(v) setting V=BEST(V) and MEMrqd(V)=BESTmem when V is equal to PL'−W;

(vi) reading an entry in the sub-range of the routing table when V is not equal to PL'−W;

(vii) calculating a second prefix value PL" as PL−W−V;

(viii) returning to step (vi) when PL" is less than two and the end of the sub-range has not been reached;

(ix) processing steps (i)–(iv) of claim 40 to obtain MEMrqd(U) when PL" is not less than two;

(x) calculating MEMrqd=MEMrqd(V)+MEMrqd(U);

(xi) returning to step (vi) when the end of the sub-range has not been reached;

(xii) incrementing the value of V by one and returning to step (iv) when MEMrqd is greater than BESTmem; and (xiii) setting=BEST(V)=V and BESTmem=MEMrqd, incrementing V by one and returning to step (iv) when MEMrqd is not greater than BESTmem.

In accordance with another aspect of the present invention there is provided a method wherein the step of selecting the width W of the first stage table, comprise the steps of:

(i) defining a sub-range as the routing table;

(ii) scanning the sub-range to find a longest prefix PL';

(iii) initializing W=1, BEST(W)=1, BESTmem=$2^{PL'}$, where BEST(W) represents a value of W that memory optimizes the data structure, and BESTmem represents a value of memory required for a memory optimized data structure;

(iv) calculating a memory requirement as MEMrqd(W)= $2^W$;

(v) setting W=BEST(W) and MEMrqd(W)=BESTmem when W is equal to PL';

(vi) reading an entry in the sub-range of the routing table when V is not equal to PL';

(vii) calculating a second prefix value PL" as PL−W;

(viii) returning to step (vi) when PL" is less than two and the end of the sub-range has not been reached;

(ix) processing steps (i)–(xiii) of claim 41 to obtain MEMrqd(V) when PL" is not less than two;

(x) calculating MEMrqd=MEMrqd(W)+MEMrqd(V);

(xi) returning to step (vi) when the end of the sub-range has not been reached;

(xii) incrementing the value of W by one and returning to step (iv) when MEMrqd is greater than BESTmem; and (xiii) setting BEST(W)=W and BESTmem=MEMrqd, incrementing W by one and returning to step (iv) when MEMrqd is not greater than BESTmem.

BRIEF DESCRIPTION OF THE DRAWINGS

The present invention will be described in conjunction with the drawings in which:

FIG. 8 illustrates a block diagram for truncating non-full forwarding tables to provide further memory optimization according to the present invention.

DETAILED DESCRIPTION OF EMBODIMENTS OF THE INVENTION

Figure 1:
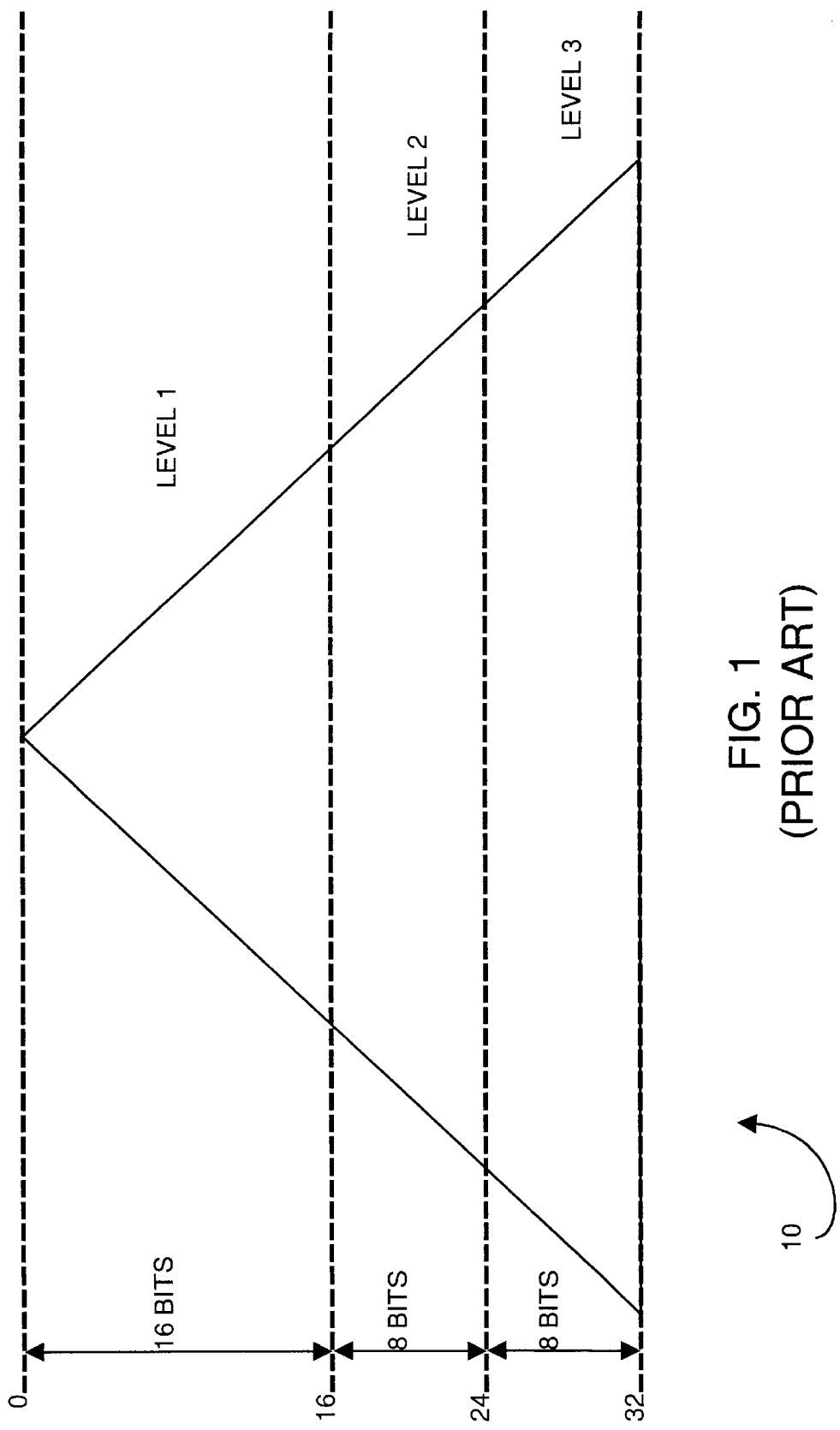
FIG. 1 illustrates a representation of a binary tree illustrating fixed multi-stage address translation according to the prior art.

The basis of the address translation/lookup method and system of the present invention is discussed for Internet packets over a TCP/IP network. However, the discussion applies analogously to other communication networks such as asynchronous transfer mode (ATM), local area network topologies (Ethernet and token ring), a telephone network with central office switches and private branch exchange networks (PBX's).

Internet Protocol Packet

The field definitions of a lpv4 (32 bit) Internet protocol (IP) packet are summarize in Table A1.

TABLE A1

| FIELD | DESCRIPTION |
|---|---|
| Ipv4 (Header Word 1) | version number to facilitate protocol evolution |
| IHL (HW1) | Internet header length-length of header in 32 bit words, minimum header is 5 words comprising 20 octets |
| service type (HW1) | type of service - specifies precedence and type of routing |
| total length (HW1) | total datagram length in octets, includes header |
| Identification (HW2) | unique datagram identification for given combination of source, destination addresses, and protocol type that persists while datagram exists within the Internet network |
| Flgs (HW2) | flags-bit(0) is reserved and must be set to zero; bit(1) indicates whether or not the packet may be fragmented, bit(2) is set in all packets except for the last fragment |
| fragment offset (HW2) | indicates position of the current fragment within the complete datagram relative to a 63 bit unit |
| time to live (HW3) | indicates the maximum lifetime of the packet within the network as measured in seconds |
| protocol (HW3) | describes the next level protocol to be used by the receiver on the data field at the destination |
| header checksum (HW3) | 16-bit one's complement of the one's complement sum of all 16-bit words of the header |
| SOURCE ADDRESS (HW4) | 32 bits wide (4–8 bit octets): 3 level hierarchical address consisting of network number, subnetwork number, and host; the subnet field may have any length as specified by a 32 bit mask |
| DESTINATION ADDRESS (HW5) | same as source address |
| options (HW6) | packet options |
| padding (HW6) | used to ensure that the Internet header terminates on a 32-bit boundary |
| data (HW7-xx) | payload-multiple number of octets, including header octets, not to exceed 65, 535 |

The term "Internet address" will be used to generically refer to both the source and destination address as defined in Table A1. There are currently five basic Internet class structures (A,B,C,D and E). The various class structures essentially define the ratio of network to host computers. For example, for a class A address the network portion is defined by 7 bits ($2^7$=128 networks), and the host portion is defined by 24 bits ($2^{24}$>16 million hosts).

Classes A–C are associated with a corresponding network mask as defined in Table A2.

TABLE A2

| CLASS | Network (n)/Host(h) Octets | NETWORK MASK Network Mask |
|---|---|---|
| A | n.h.h.h | 255.0.0.0 |
| B | n.n.h.h | 255.255.0.0 |
| C | n.n.n.h | 255.255.255.0 |

Class C networks use the network mask 255.255.255.0, which results in a large number of networks each consisting of 255 hosts. To provide greater flexibility in provisioning networks and hosts, the Class C network has been defined (by Internet standards organizations) as a classless network that provides a variable length network mask within it's class. By specifying a prefix length, the network mask is given a range from "255.248.0.0" to "255.255.255.224", which represents 13 contiguous binary ones to 27 contiguous binary ones. The range is defined as having a prefix length of /13 to /27 (details provided in Table B1). The resulting network mask is a 32-bit binary number with a binary one at each bit in the network portion of the address and a binary zero at each host address bit of the address.

TABLE B1

| PREFIX LENGTH | NETWORKS | HOSTS | NETWORK MASK |
|---|---|---|---|
| /13 | $2^{10}$ = 1,024 | $2^{19}$ = 524,288 | 255.248.0.0 |
| /14 | $2^{11}$ = 2,048 | $2^{18}$ = 262,144 | 255.252.0.0 |
| /15 | $2^{12}$ = 4,096 | $2^{17}$ = 131,072 | 255.254.0.0 |
| . | | | |
| . | | | |
| /21 | $2^{18}$ = 262,144 | $2^{11}$ = 2,048 | 255.255.248.0 |
| /22 | $2^{19}$ = 524,288 | $2^{10}$ = 1,024 | 255.255.252.0 |
| /23 | $2^{20}$ = 1,048,576 | $2^9$ = 512 | 255.255.254.0 |
| /24 | $2^{21}$ = 2,097,152 | $2^8$ = 256 | 255.255.255.0 |
| /25 | $2^{22}$ = 4,194,304 | $2^7$ = 128 | 255.255.255.128 |
| /26 | $2^{23}$ = 8,388,608 | $2^6$ = 64 | 255.255.255.192 |
| /27 | $2^{24}$ = 16,772,216 | $2^5$ = 32 | 255.255.255.224 |

A computer connected to a TCP/IP network has a unique address defined by four numbers separated by a full stop, for example "194.64.121.53". As discussed above, this address is referred to as an IP address where each numeric field is an 8-bit octet with a value between 0 and 255. The 4-octets of addressing collectively represent a 32-bit binary number that consists of two parts: the network number and the host number.

The network class or an associated prefix length value determines the length of the network address portion of the 32-bit binary number with the remaining lower order bits being identified with the host address. IP routers use the network address to determine the physical network that needs to be reached in order to connect to the computer having the given host number.

Definitions

The following terms form the basis of discussion of the present invention.

Prefix: the effective address to be translated.

Prefix length (PL): the number of bits of the prefix required to map the prefix to a proper resource index (e.g. in the IP domain the prefix length represents the network portion of the IP address).

Resource Index (RI): target information for a prefix such as a port number, queue pointer etc.

Record Types

A generic data record of the forwarding table data structure of the present invention is referred to as an action record. The action record includes a pair of data elements: a pointer (Ptr) and an action indicator (AI).

action record=[Ptr,AI]

There are three possible forms of the action record according to one embodiment of the present invention:

(1) null/empty record: [Ptr,AI]=[0,0], where the record indicates that no match is available (the system is instructed to use either a default resource index or discard the address);

(2) resource record: [Ptr,AI]=[RI,0], where the record provides the required target information (from RI field); and (3) pointer record: [Ptr,AI]=[table,width], where an address (using width field) to a subsequent table (using table field) is required to continue translation of the prefix.

Forwarding Table Data Structure

Figure 2:
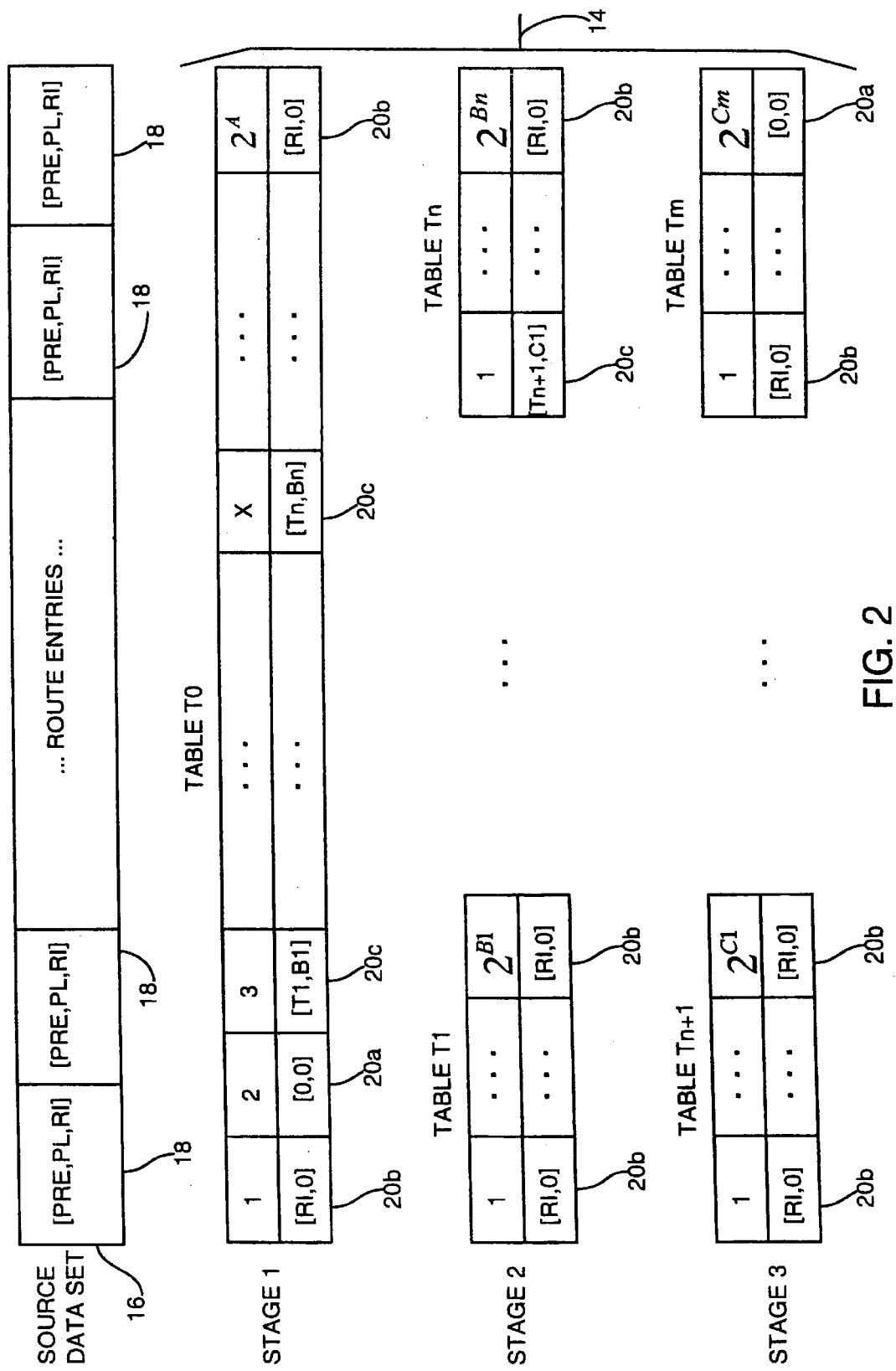
FIG. 2 illustrates a block diagram of the forwarding table data structure according to an embodiment of the present invention.

FIG. 2 provides a block diagram illustration of a forwarding table data structure 14 of the present invention. A source data set 16 includes a plurality (typically 40–60,000 in an IP router) route entries each represented by a record 18. The record 18 includes a prefix (PRE), a prefix length (PL), and a resource index (RI).

The data structure 14 includes a plurality of tables (T0, T1, ..., Tn, Tn+1, ..., Tm) organized in multiple stages (3 in the example of FIG. 2). The number of stages is not fixed in advance and can range from 2 to 4 or more depending on the source data set, memory restrictions and the like.

Each table contains a set of action records [Ptr,AI] as defined above. The three possible forms of the action record are shown in FIG. 2: an null/empty record [0,0] 20a, a resource record [RI,0] 20b, and a pointer record [table, width] 20c.

The first stage table T0 is addressed using the first A most significant bits of a prefix of a route entry 18. The first stage table has a "width" of $2^A$. The set of second stage tables T1, ..., Tn are addressed when directed by the action record in the preceding stage. For example, for entry 3 in table T0 the action record is equal to [T1,B1]. This record directs address translation to the second stage table T1 using the next B1 bits of the prefix after the first A bits. The "width" of the second stage table T1 is $2^{B1}$.

Similarly, the set of third stage tables Tn+1, ..., Tm are addressed when directed by the action record in the preceding stage. For example, for entry 1 in table Tn the action record is equal to [Tn+1,C1]. This record directs address translation to the third stage table Tn+1 using the next C1 bits of the prefix after the first A+Bn bits. The "width" of the third stage table Tn+1 is $2^{C1}$.

A detailed description of how the forwarding table data structure 14 is created is provided hereinbelow in conjunction with FIGS. 3A–3L.

Search Tree

The forwarding table data structure 14 shown in FIG. 2 can also be described using a search tree model. The data structure can be viewed as a tree having a single root and a plurality of nodes. Each node having at least two and possibly many more pointers. The pointers contain addresses of either other nodes or the resource index.

In order to select a pointer the n most significant bits of the prefix are used in a look-up procedure. This is accommodated by the "width" variable. The value of the variable width is a characteristic of the node and can be stored in a field of the node. Consequently, a node of the tree of the present invention consists of a width W variable followed by an array of $2^W$ pointers.

The variable/field width W can be individually assigned to each node. This results in each node having potentially different sized pointer arrays, which can be chosen to minimize the total memory required and optimized to a particular routing table.

In the above tree model description, an object oriented model was used where the width field was stored within the same node as the table it refers to. However, with the exception of the root node, all nodes are reached through pointers in previous nodes. Consequently, the width field can also be stored alongside the pointer in each array of pointers or in a separate array of width values to apply to the next step.

A special value for the action indicator for resource index based records (e.g. zero) is used to indicate that the target information has been obtained and no further addressing to another table need be performed.

Building the Forwarding Table Data Structure

A method of creating a forwarding table data structure from a routing table is detailed in the flow charts of FIGS. 3A to 3L. The routing table contains a number of route entries where each route entry contains a prefix representing an address, a prefix length and a resource index.

FIG. 3A

A width W for a first stage table T0 is selected at step 30, where $1 \leq W \leq N$ and N is the maximum prefix length. Initially the selection of the value of W is arbitrary. An optimization procedure described in conjunction with FIGS. 4A–E provides a structured optimized approach to selecting "width" variables.

The first stage table T0 of a size equal to $2^W$ is created at step 32. The first stage table T0 is created with empty records. A record is "empty" if it contains a known empty value, for example [0,0], or other predefined value, which is not either a resource index or a table pointer. In practice, NULL(0) is commonly used since the memory location 0 is not normally pointed to by any application pointer. The implications of this will become apparent as the table T0 is populated with data records.

A route, consisting of a prefix, prefix length (PL) and resource index (RI), is read at step 34 from a routing table that has been sorted in ascending order.

An offset A is computed at step 36 from the first W bits of the prefix of the route read at step 34. For example, if the prefix is 10110110000000000 with a prefix length of seven and a width W of four then the computed offset is equal to A=1011. The offset A represents a location in the table T0 where information relating to the route will be stored. The offset A is padded to the right with 0's if W is greater than the prefix length PL.

A comparison between the prefix length PL of the route read at step 34 and the selected width W of the first stage table T0 is made at step 38. If the prefix length PL of the route is equal to the width W of the first stage table T0, then a data record is created at step 40. The data record includes the resource index RI of the route and an action indicator AI of 0. The data record [RI,AI]=[RI,0] is stored at the offset A in the first stage table T0 at step 42. Processing returns to step 34 to read another route entry. Each route entry is processed only once. Therefore, if no further records in the routing table need to be processed then the forwarding tables are completed.

FIG. 3B

Figure 3A:
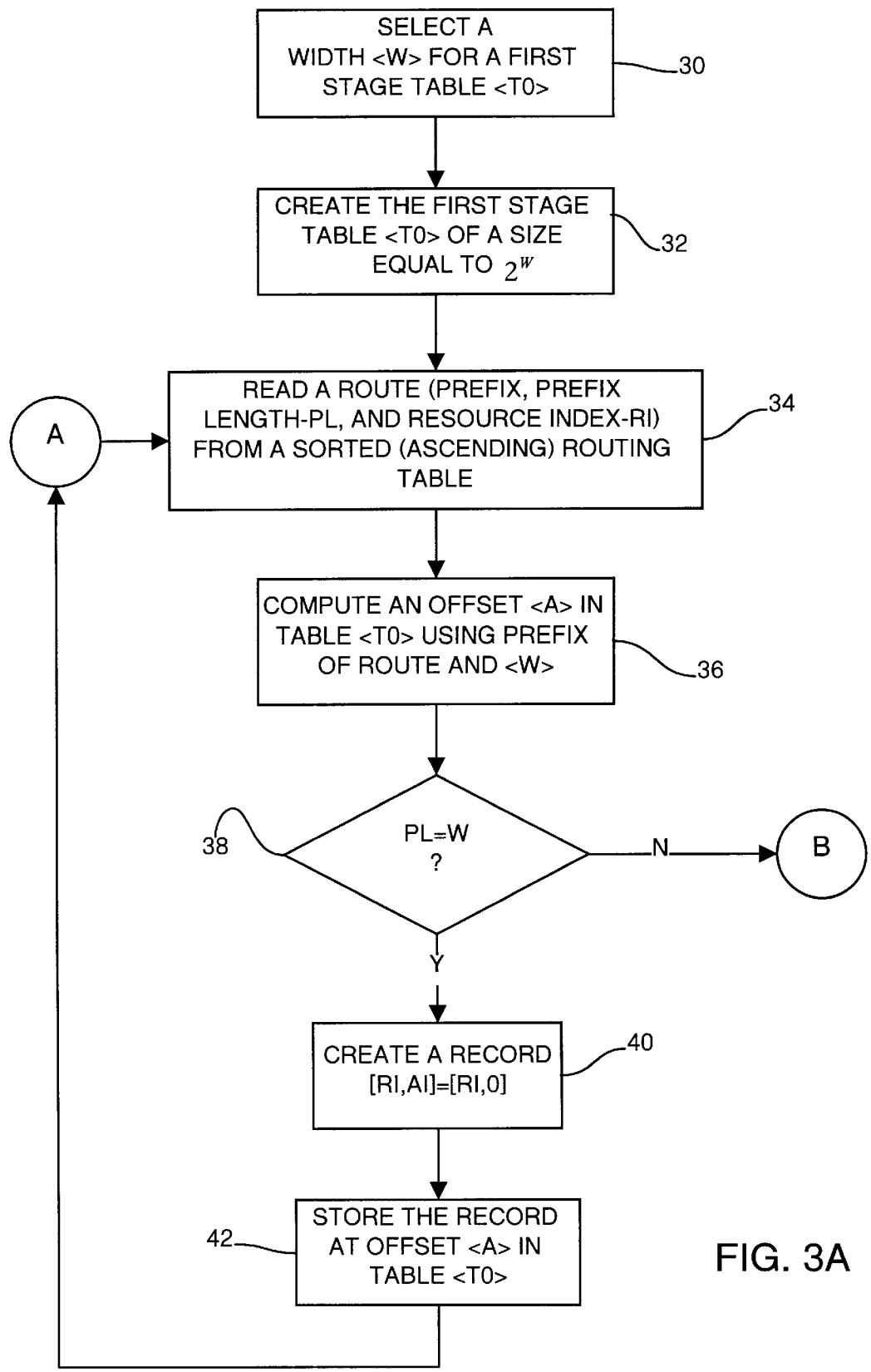
FIGS. 3A, 3B, 3C, 3D, 3E, 3F, 3G, 3H, 3I, 3J, 3K, 3L illustrate flow charts for creating the forwarding table data structure according to an embodiment of the present invention.
Figure 3B:
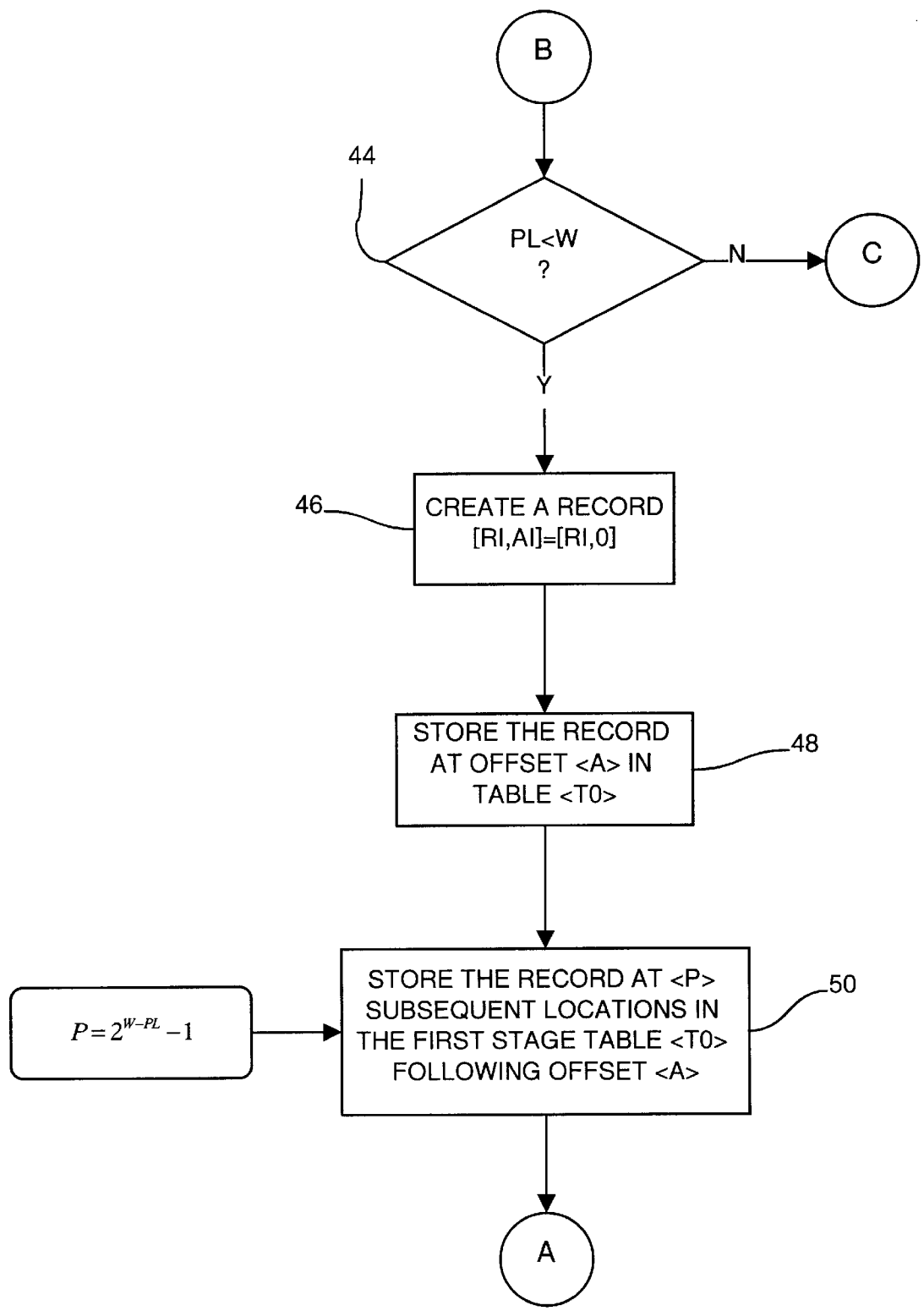

If the prefix length PL is not equal to the width W of the first stage table T0 (as determined at step 38 in FIG. 3A) then processing passes to a further comparison block 44 in FIG. 3B.

If the prefix length PL of the route is less than the width W of the first stage table T0, then a data record is created at step 46. The data record includes the resource index RI of the route and an action indicator AI of 0. The data record [RI,AI]=[RI,0] is stored at the offset A in the first stage table T0 at step 48. A copy of the same data record [RI,0] is stored in P subsequent locations in the first stage table T0 following the offset A at step 50, where $P=2^{W-PL}-1$. Processing returns to step 34 to read another route entry.

FIG. 3C

Figure 3C:
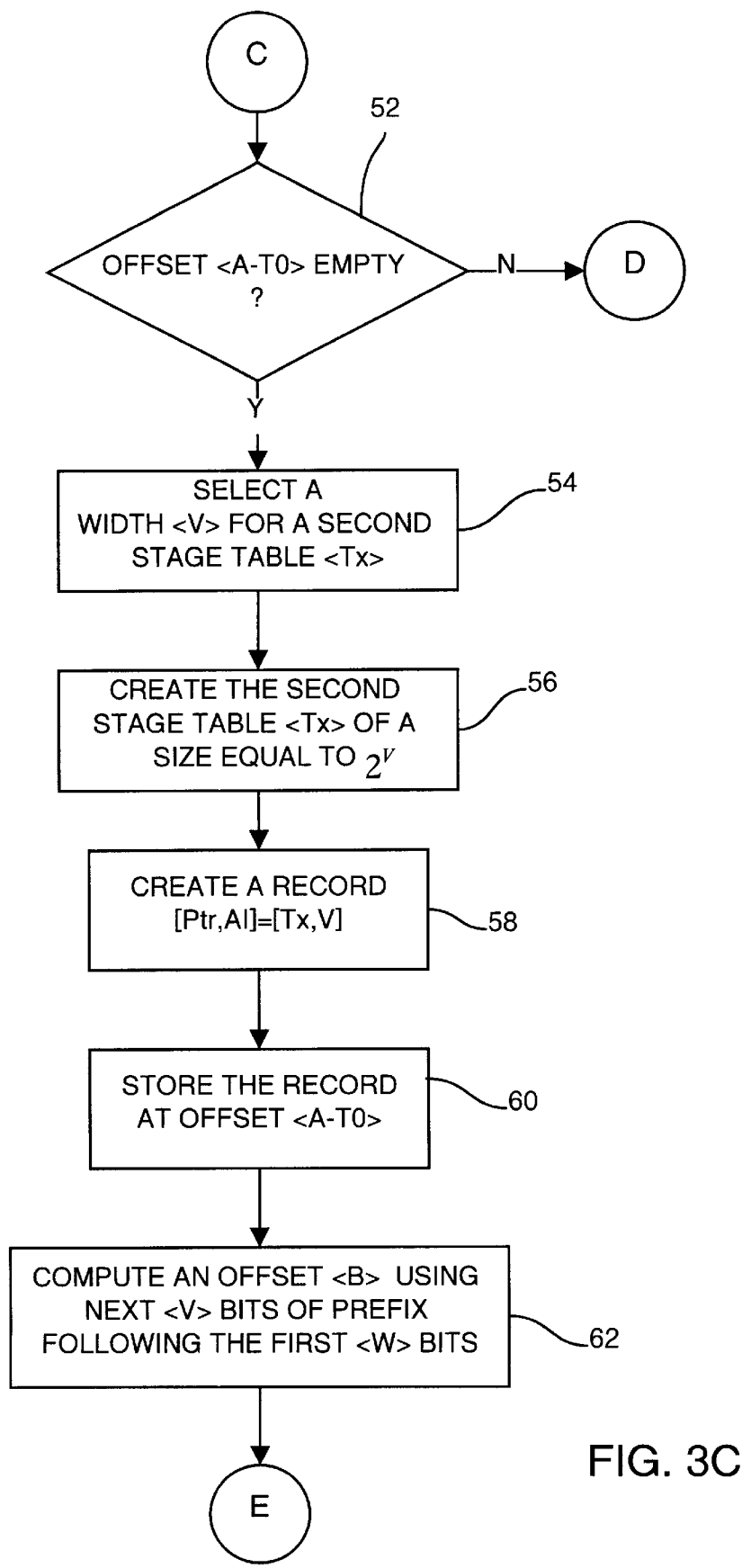

If the prefix length PL is not less than the width W of the first stage table T0 (as determined at step 44 in FIG. 3B) then processing passes to a further comparison block 52 in FIG. 3C.

If the table entry at offset A in table T0 is empty, then a second stage table width V is selected at step 54. If processing reaches step 52, PL is greater than W in view of decision steps 38 and 44. The notation <A-T0> is used in the drawings as a short form to represent: "the offset A in table T0". A second stage table Tx (x=1,2, ... ) of a size equal to $2^V$ is created at step 56.

A data record is created at step 58 containing a pointer Ptr to the second stage table Tx and an action indicator AI equal to the width V of the second stage table Tx. The data record [Ptr,AI]=[Tx,V] created at step 58 is stored at the offset A in the first stage table T0 at step 60.

An offset B is computed at step 62 by taking the next V bits of the prefix following the first W bits. For example, for the prefix of the previous example 10110110000000000 (with W=4 and V set to 3) the offset B would be equal to 011.

Figure 3D:
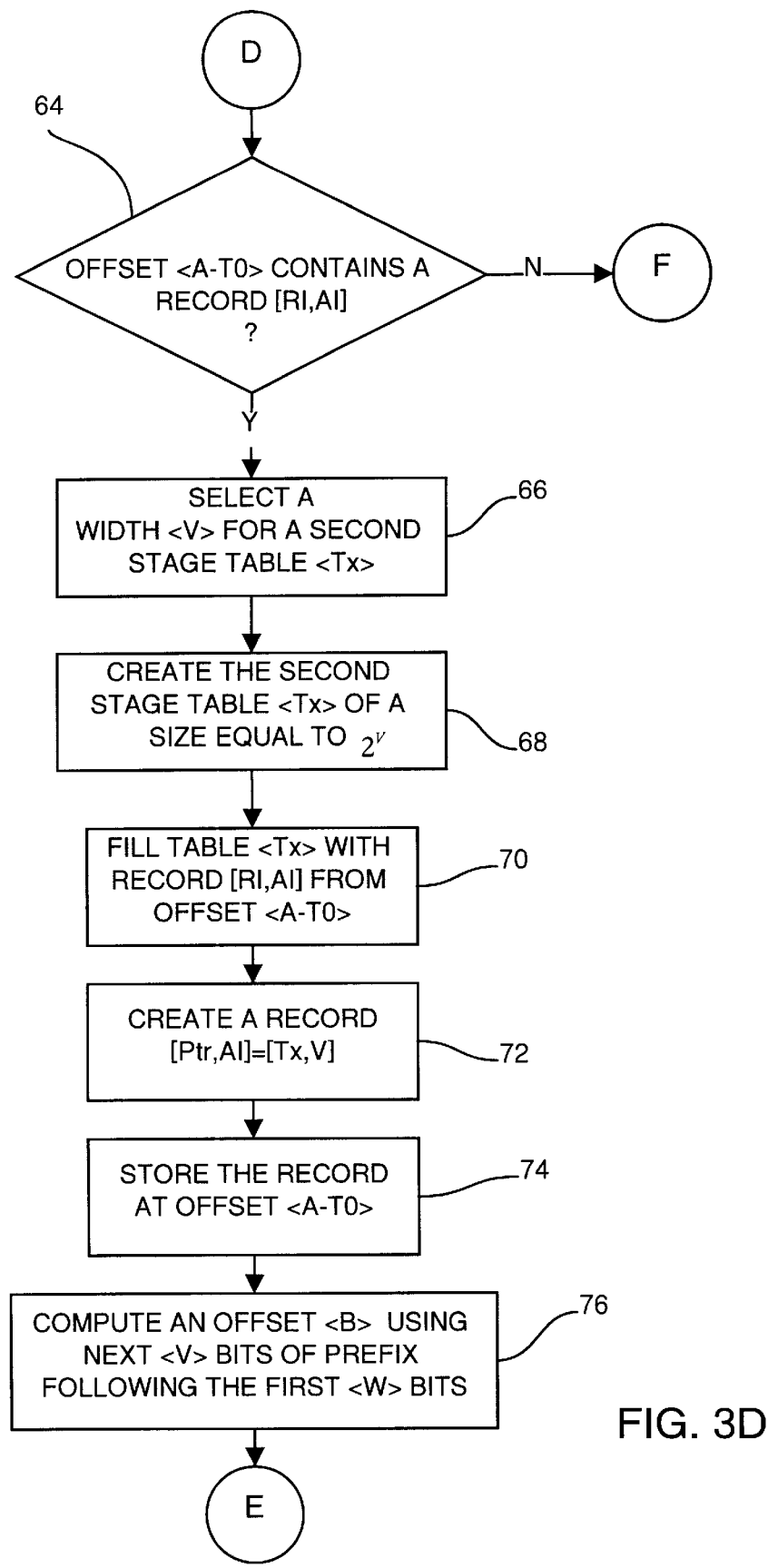
Figure 3E:
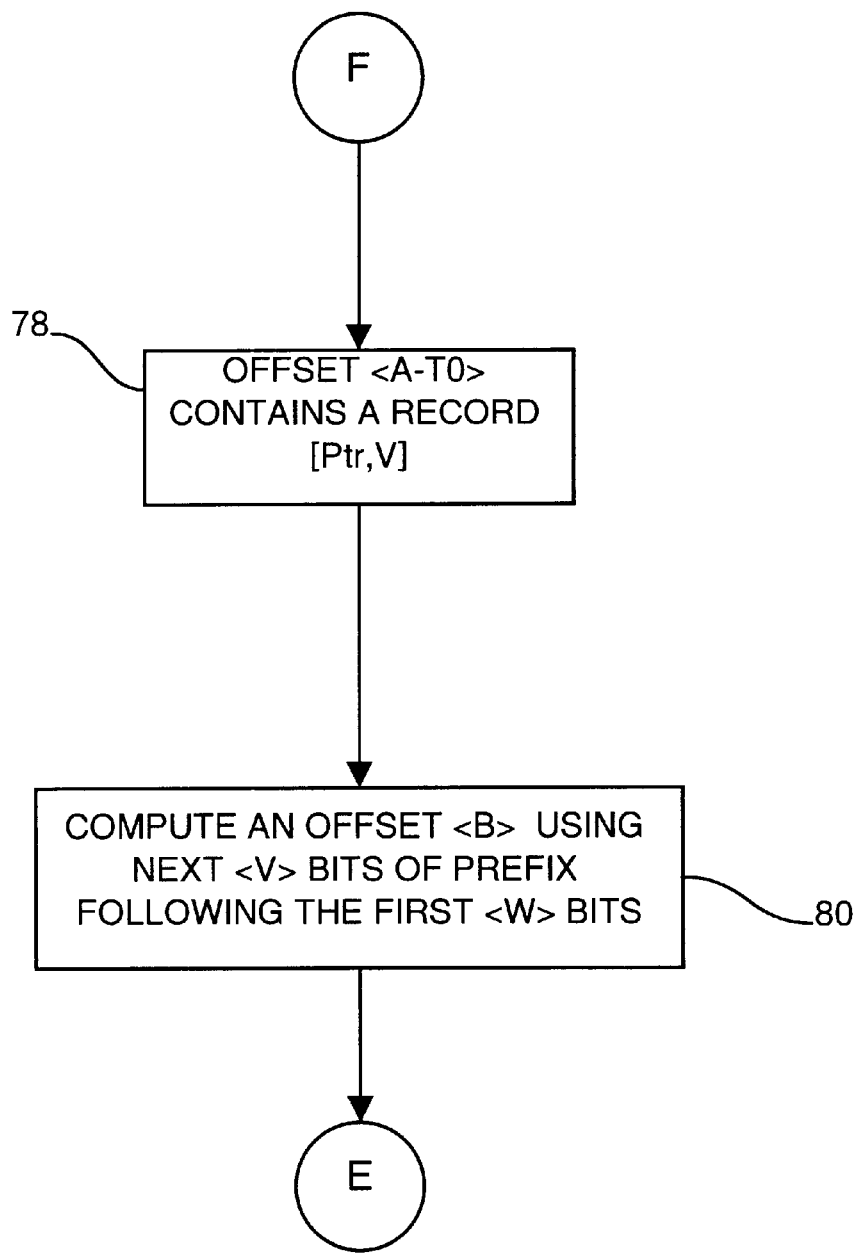
Figure 3F:
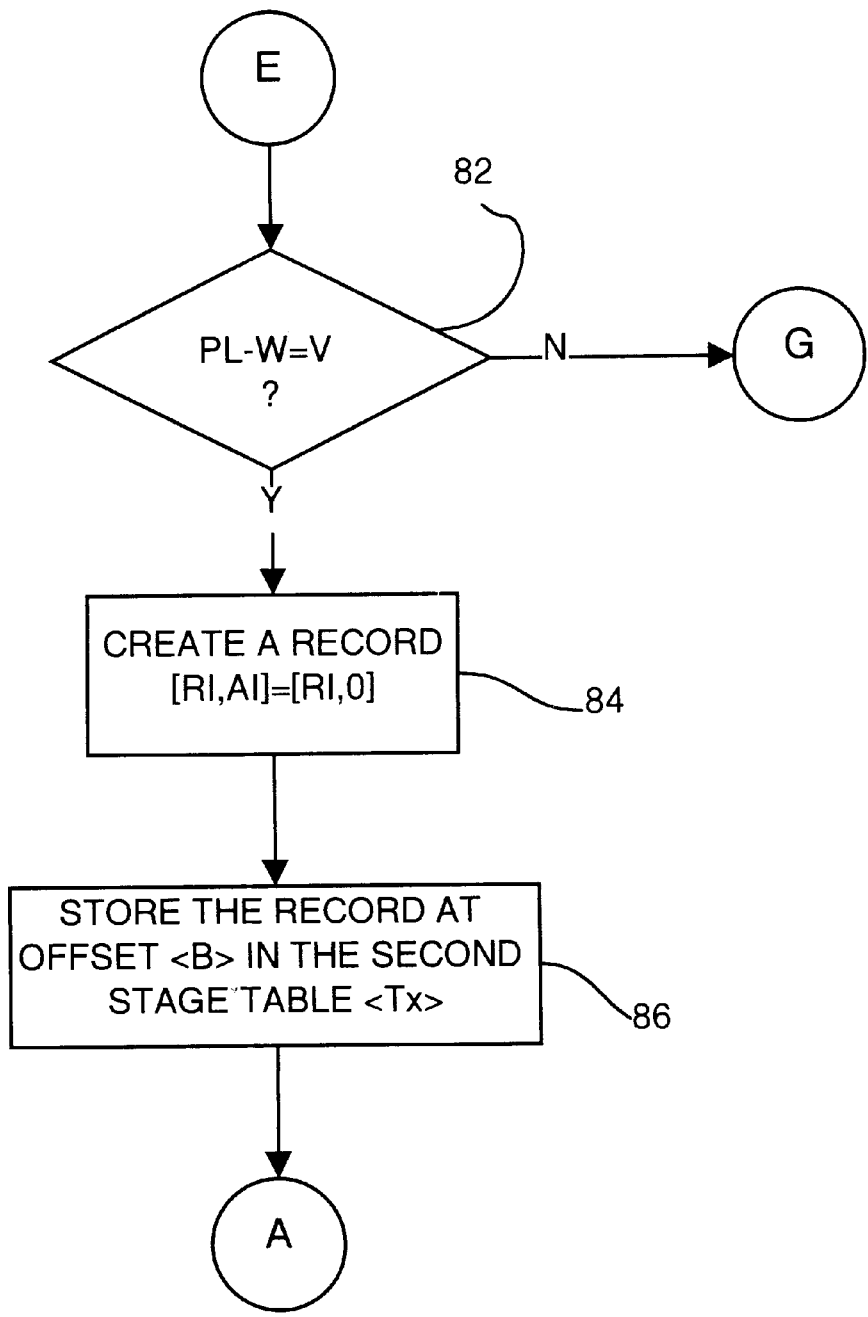

After step 62 processing passes to a second stage processing level that begins at FIG. 3F as detailed hereinbelow.
FIG. 3D If the offset A in table T0 not empty, i.e., contains a record (either a resource or pointer type), as determined at step 52 in FIG. 3C, then processing passes to a further comparison block 64 in FIG. 3D.

If the table entry at the offset A of table T0 is a resource record [RI,AI], then a second stage table width V is selected at step 66. A second stage table Tx (x=1,2, ... ) of a size equal to $2^V$ is created at step 68. The entire second stage table Tx created at step 68 is filled with a copy of the resource record [RI,AI] from the offset A in the first stage table T0 at step 70. Note that a different second stage table is created from a previously created second stage table. In particular, as the data structure 14 is built many (possible thousands for a 40,000 entry table) second stage tables are created independently based on the processes described herein.

A data record is created at step 72 containing a pointer Ptr to the second stage table Tx and an action indicator AI equal to the width V of the second stage table Tx. The data record [Ptr,AI]=[Tx,V] created at step 72 is stored at the offset A in the first stage table T0 at step 74.

An offset B is computed at step 76 by taking the next V bits of the prefix following the first W bits as previously discussed.

After step 76 processing passes to a second stage processing level that begins at the next drawing: FIG. 3F.
FIG. 3E If the offset A in table T0 is not occupied with a resource record [RI,AI] (as determined at step 64 in FIG. 3D) then the offset A in table T0 is occupied with the only other available record type: a pointer record [Ptr,V] at step 78 in FIG. 3E.

An offset B is computed at step 80 by taking the next V bits of the prefix following the first W bits as previously discussed.

After step 80 processing passes to a second stage processing level that begins at FIG. 3F as detailed hereinbelow.
FIG. 3F—Second Stage Processing Level A comparison between a modified prefix length PL–W of the route and the width V of the second stage table Tx is made at step 82.

Figure 3G:
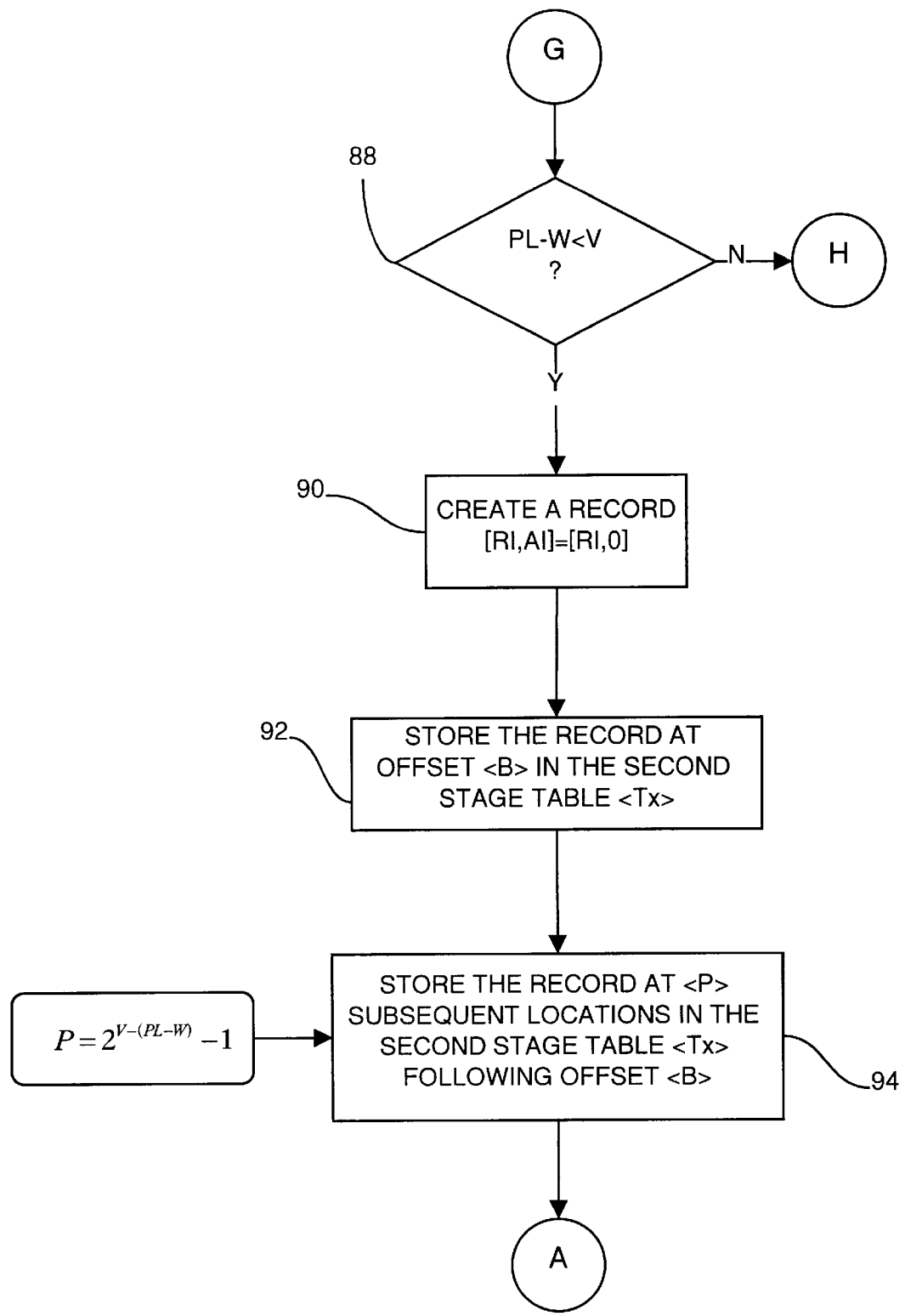

If the modified prefix length PL–W of the route is equal to the width V of the second stage table Tx, then a data record is created containing the resource index RI of the route and an action indicator AI of 0 at step 84. The data record [RI,0] is stored at the offset B in the second stage table Tx at step 86. Processing returns to step 34 to read another route entry.
FIG. 3G If the modified prefix length PL–W is not equal to the width V of the second stage table Tx (as determined at step 82 in FIG. 3F) then processing passes to a further comparison block 88 in FIG. 3G.

If the modified prefix length PL–W of the route is less than the width V of the second stage table Tx, then a data record containing the resource index RI of the route and an action indicator AI of 0 is created at step 90. The data record [RI,0] is stored at the offset B in the second stage table Tx at step 92. The same record [RI,0] is stored in P subsequent locations in the second stage table Tx following the offset B at step 94, where $P=2^{V-(PL-W)}-1$.

Figure 3H:
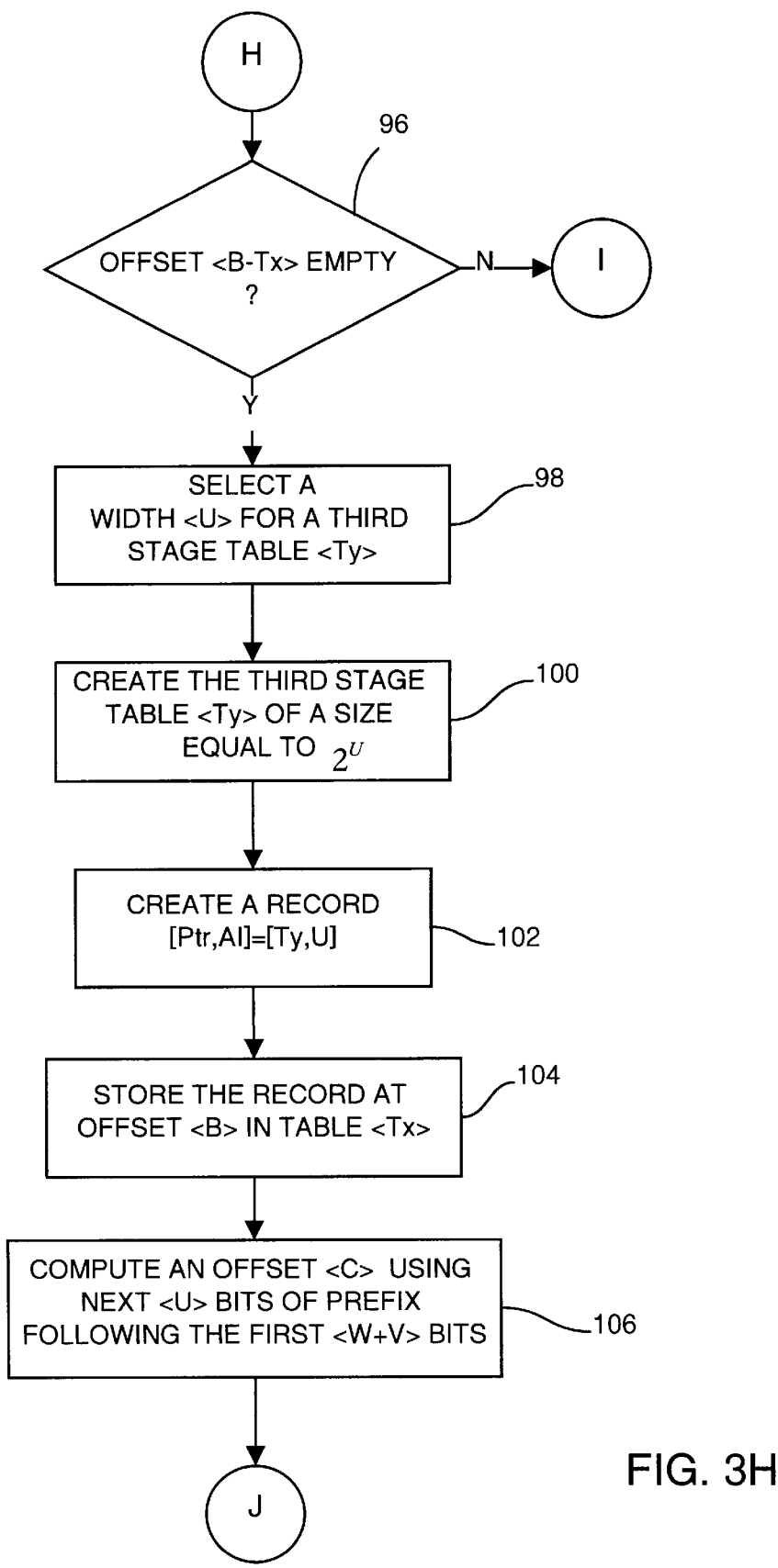

Processing returns to step 34 to read another route entry.
FIG. 3H

If the modified prefix length PL–W is not less than the width V of the second stage table Tx (as determined at step 88 in FIG. 3G) then processing passes to a further comparison block 96 in FIG. 3H.

Since the modified prefix length PL–W of the route is not equal to V (step 82) and not less than V (step 88) it must be greater than the width V of the second stage table Tx. If the record at offset B in table Tx is empty, then a third stage table width U is selected at step 98. The width U, in this three stage embodiment, is calculated as PL'–W–V, where PL'≧PL. The value for PL' is calculated as follows:

the routing table 16 is scanned ahead to find the longest prefix PX', with prefix length PL', such that the first PL bits of PX' are identical to the PL bits of PX (the current route prefix).

TABLE R1

| ROUTE | PX | PL |
|---|---|---|
| Route A | 1011000000 | 4 |
| Route B | 1011000000 | 6 |
| Route C | 1011010000 | 6 |
| Route D | 1011011000 | 7 |
| Route E | 1100000000 | 4 |

For example, based on the data in Table R1, PL' for routes A–D is equal to 7 since it is the longest PL and Routes B–D share the same 4 bits as Route A. Route E differs in the first four bits of PX. Note that since the routing tables are sorted, the additional, more specific routes always immediately follow the current route being processed.

A third stage empty table Ty (y=$x_{max}$+1, $x_{max+}$2 . . .) of a size equal to $2^U$ is created at step 100. In this embodiment, the width U represents the number of remaining bits in the prefix. If four or more stages are desired then U would be selected as a value less than PL'–W–V. This is a design choice and can be flexible assigned based on the routing table data, prefix length, memory restrictions and other factors.

A data record containing a pointer Ptr to the second stage table Ty and an action indicator AI equal to the third stage table Ty width U is created at step 102. The record [Ty,U] is stored at the offset B in the second stage table Tx at step 104.

An offset C is computed at step 106 by taking the next U bits of the prefix following the first W+V bits. For example, for the prefix of the previous example 10110111010000000 (with PL'=10, W=4, V=3 and U=PL'–W–V=3) the offset C would be equal to 101. This result assumes that the next route in the routing table differs in the first 10 bits.

Figure 3I:
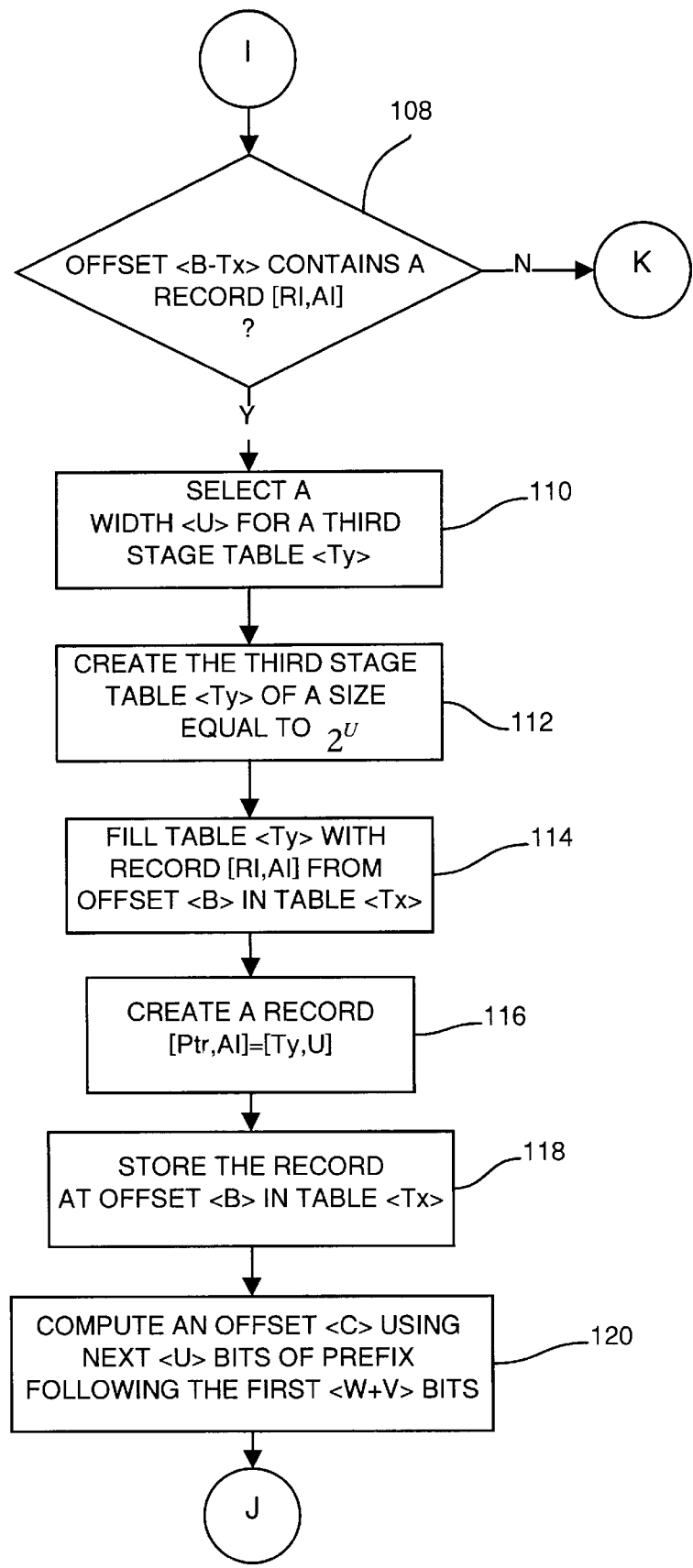

After step 106 processing passes to a third stage processing level that begins at FIG. 3K as detailed hereinbelow.
FIG. 3I If the entry at offset B of the second stage table Tx is occupied with a record (as determined at step 96 in FIG. 3H) then processing passes to a further comparison block 108 in FIG. 3I.

If the entry at offset B in the second stage table Tx contains a resource record [RI,AI], then a third stage table width U=PL'−W−V is selected at step 110 as discussed in conjunction with step 98 in FIG. 3H. A third stage table Ty ($y=x_{max}+1$, $x_{max}+2$, ...) of a size equal to $2^U$ is created at step 112. The entire third stage table Ty created at step 112 is filled with a copy of the resource record [RI,AI] from offset B in the second stage table Tx at step 114.

A data record containing a pointer Ptr to the third stage table Ty and an action indicator AI equal to the third stage table Ty width U is created at step 116. The record [Ty,U] is stored at the offset B in the second stage table Tx at step 118.

An offset C is computed at step 120 by taking the next U bits of the prefix following the first W+V bits as previously discussed.

After step 120 processing passes to a third stage processing level that begins at FIG. 3K as detailed hereinbelow.

FIG. 3J

Figure 3J:
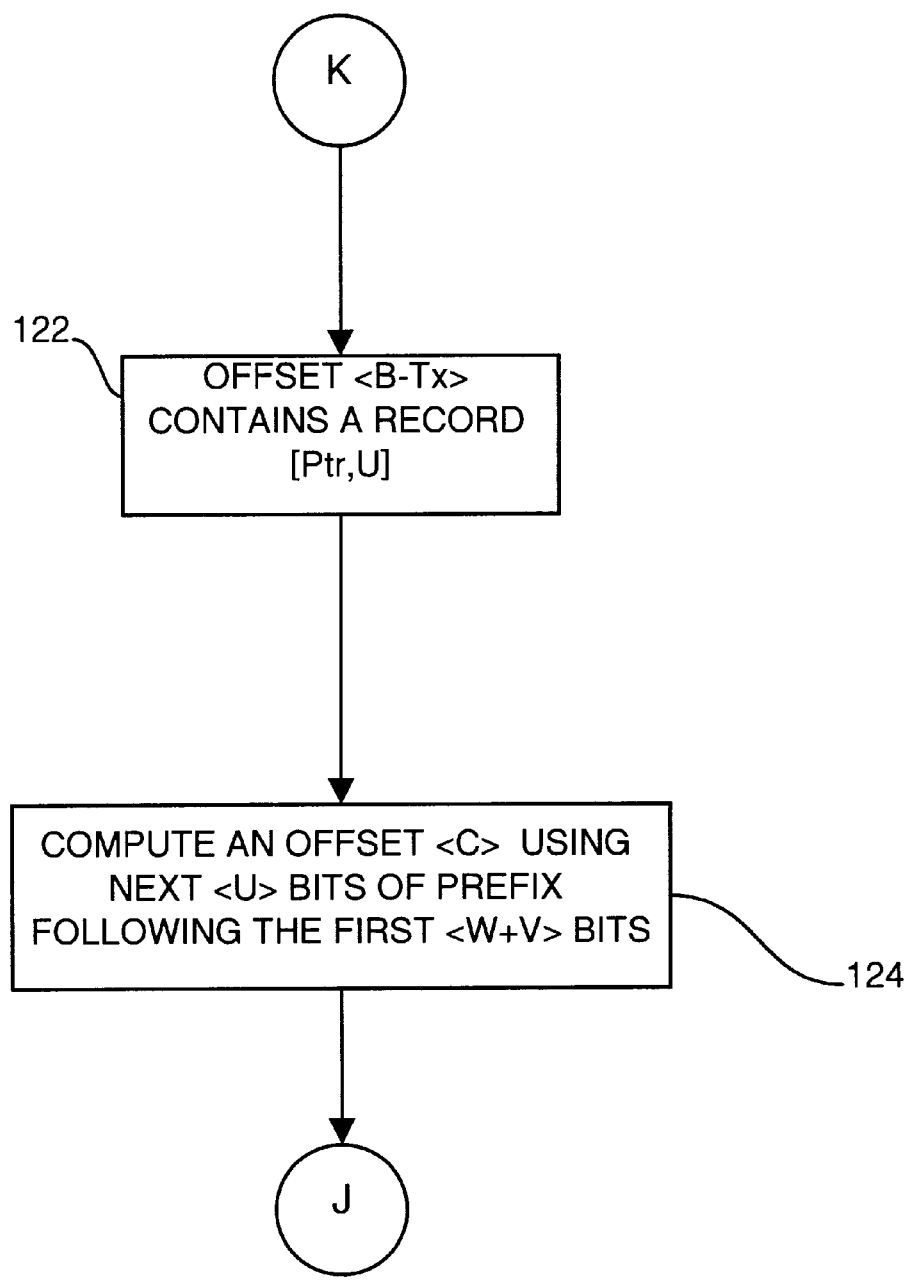

If the offset B in table Tx is not occupied with a resource record [RI,AI] (as determined at step 108 in FIG. 3I) then the offset B in table Tx is occupied with the only other available record type: a pointer record [Ptr,U] at step 122 in FIG. 3J.

An offset C is computed at step 124 by taking the next U bits of the prefix following the first W+V bits as previously discussed.

After step 124 processing passes to a third stage processing level that begins at the next figure: FIG. 3K.

Figure 3K:
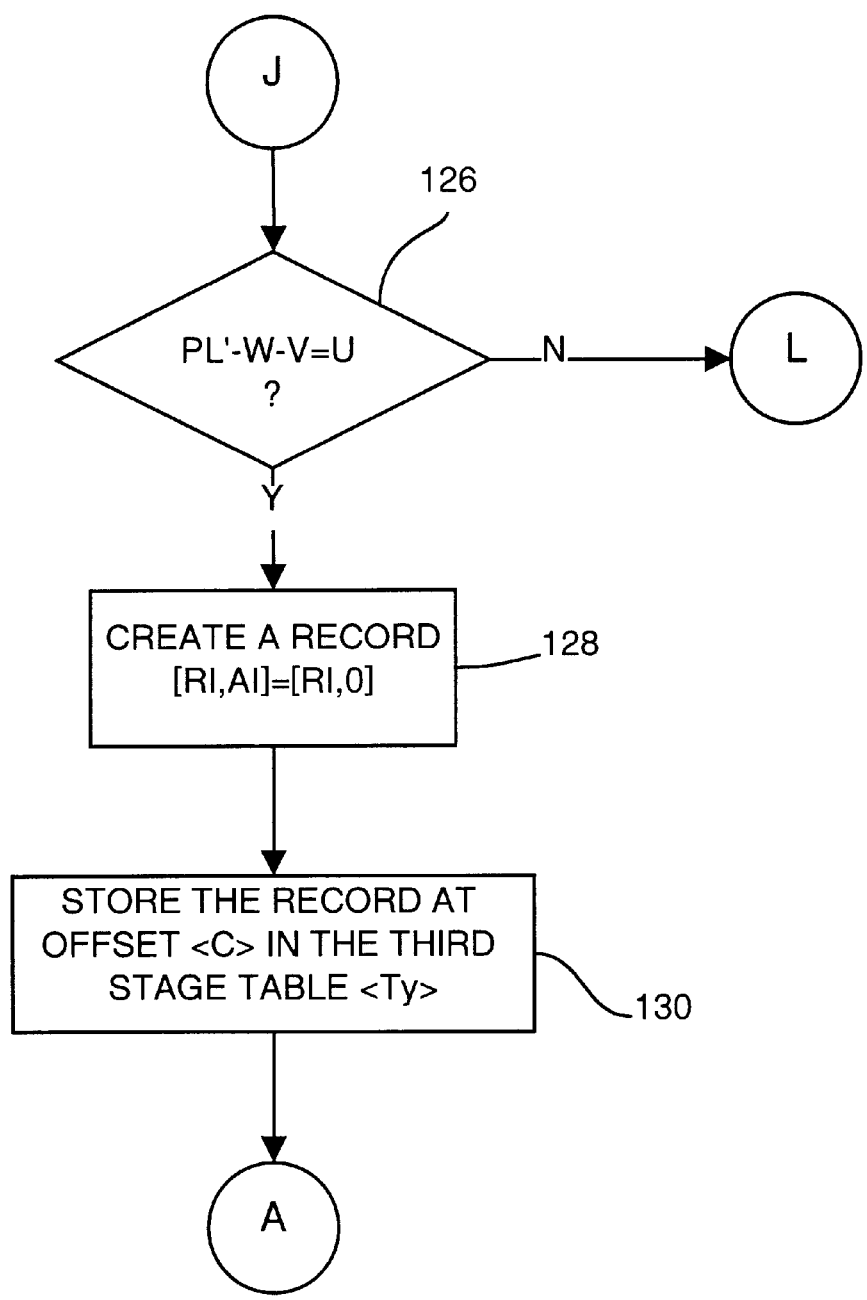

FIG. 3K—Third Stage Processing Level

A comparison between a modified prefix length PL'−W−V of the route and the width U of the third stage table Ty is made at step 126.

If the modified prefix length (PL'−W−V) of the route is equal to the width U of the third stage table Ty, then a data record containing the resource index (RI) of the route and an action indicator (AI) of 0 is created at step 128. The data record [RI,0] is stored at the offset C in the third stage table Ty at step 130. Processing returns to step 34 to read another route entry.

FIG. 3L

Figure 3L:
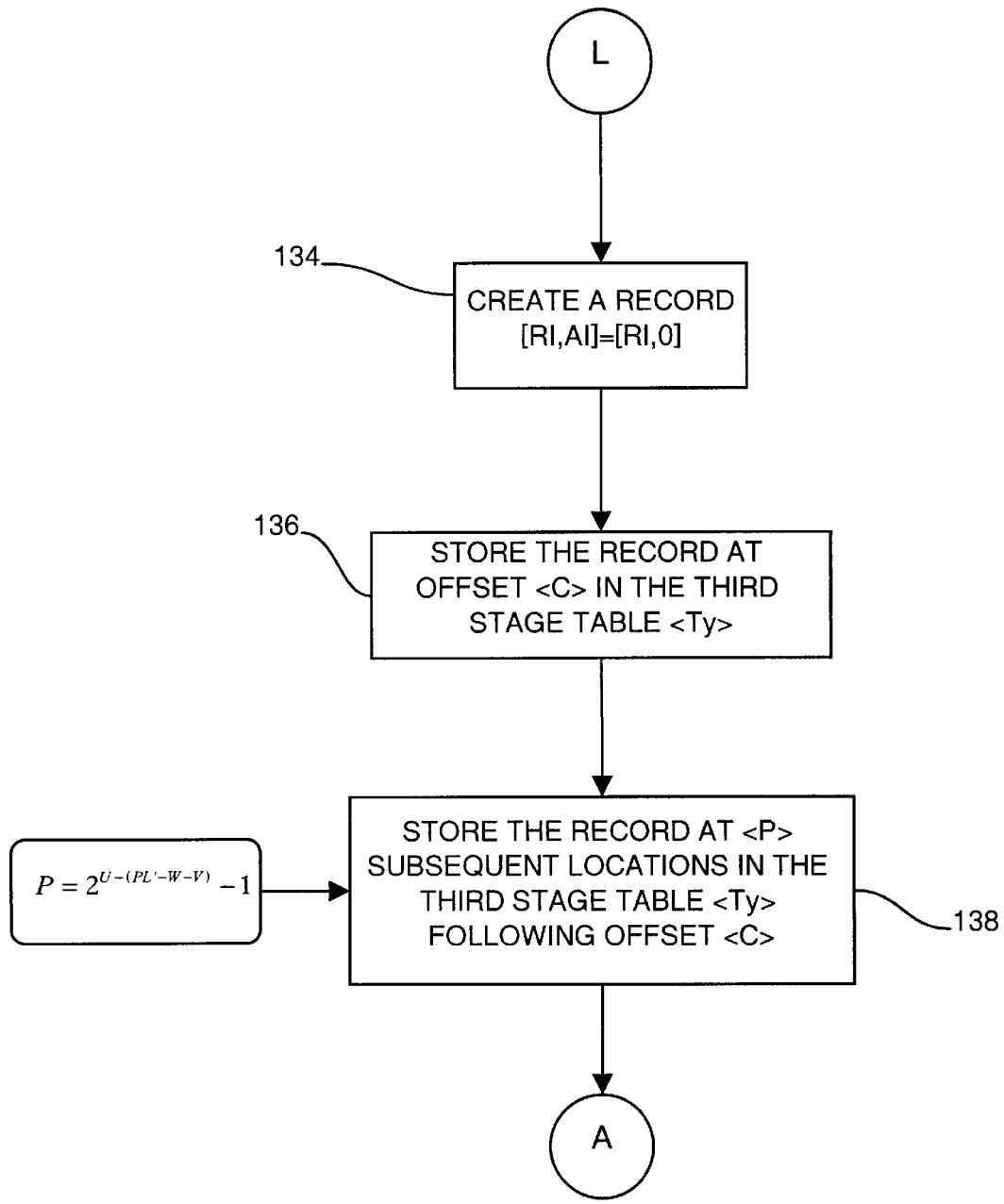

If the modified prefix length (PL'−W−V) is not equal to the width U of the third stage table Ty (as determined at step 126 in FIG. 3K) then processing passes to a record creation step 134 in FIG. 3L.

A data record containing the resource index RI of the route and an action indicator AI of 0 is created at step 134. The data record [RI,0] is stored at the offset C in the third stage table Ty at step 136. The same record [RI,0] is stored in P subsequent locations in the third stage table Ty following the offset C at step 138, where $P=2^{U-(PL'-W-V)}−1$. Processing returns to step 34 to read another route entry.

The modified prefix length (PL'−W−V) of the route cannot be greater than the width U of the third stage table Ty because U was chosen in step 110 to be equal to PL'−W−V, where PL' is the the maximum prefix length of a group of routes. Consequently, as previously discussed, if a fourth stage (or more) of tables was desired than step 110 would assign a smaller value to U and additional comparisons and processing steps would be performed similar to those described above in relation to stage 1, 2 and 3 processing.

Memory Optimization

The following additional terms will be used to aid in the description of a memory optimization process according to the present invention:

(1) A sub-prefix of M bits is similar to a real prefix of prefix length M, but the sub-prefix may not actually exist as a real prefix in the routing table. The sub-prefix may be a partly masked real prefix (excess bits set to 0) or an extended real prefix (padded to M bits with 0s).

(2) A sub-range of routes under mask M, is a set of routes in the routing table that share the same sub-prefix of M bits. This actually forms the basis of the way the widths (U, V, W) are calculated.

(3) Given a value of M, there are $2^M$ possible sub-ranges, and each sub-range contains a possible $2^{(N-M)}$ addresses, but generally much fewer, actual routes exist in typical routing tables. A sub-range may be empty in the actual routing table, or it may contain one or more actual routes.

The routing table as a whole is a single sub-range, mapped onto the first stage forwarding table [T0, W]. Each entry in table T0 then defines a sub-range of routes under mask W, and there are $2^W$ such sub-ranges.

If a sub-range is empty, the corresponding entry in T0 is null [0,0]. If the sub-range contains only a single route, the corresponding entry is a resource record [RI,0]. If the sub-range contains more than one route, the table T0 entry is a pointer record to a second level table [Tx,V].

Therefore, each second level table Tx is responsible for a single sub-range under W, which is split into $2^V$ smaller sub-ranges under (W+V). Similarly, third level tables Ty create sub-ranges under (W+V+U) of potential size $2^{(N-W-V-U)}$ or $2^{(PL'-W-V-U)}$.

The goal of the memory optimization process is to minimize the memory required for the sum of all forwarding tables. The total memory requirement is simply the sum of the memory requirements of all individual tables, where each table requires $K*2^I$ bytes, where K is a common constant—the memory used by a single table entry and I=W or V or U. In particular, the value of I varies from table to table and is equal to the different values of the table width variables W, V, U of the various tables.

The memory optimization process involves a series of sub-range optimization processes individually called a "sub-range-optimizer" (SO-x), where x=U, V, and W (i.e. the table widths required to be set in the forwarding table creation process discussed previously).

Each time the table creation process is called upon to choose a width for a next-level table, it defines the sub-ranges the next table is to cover. The sub-range-optimizer process calculates memory required for each choice of width over the feasible range of width values, and then yields the width that results in the smallest amount of memory.

The memory optimization process uses the actual entries of the routing table that fall into the sub-ranges. If necessary, this process subdivides the sub-range further (without actually creating any tables) and calls a copy of itself to optimize the smaller sub-ranges until all sub-ranges are either empty, contain only one member, or a maximum predefined depth (corresponding to the number of table stages) is reached.

In general, the memory optimization process works as follows: at every stage of the table creation process where a table width (I=W,V,U) is to be selected run the sub-range-optimizer (SO-x) to obtain width I. The inputs to the sub-range-optimizer are the set of routes in the routing table that are included in the sub-range (i.e. all routes that share the same sub-prefix with the current route being processed). For example, to choose V for a given W, the sub-range includes all routes in the routing table that have the same sub-prefix under W bits.

In practice the sub-range-optimizer (SO-x) processes are recursive. However, to simplify the description, a non-recursive form will be used where the process is divided into three separate processes (SO-U, SO-V, and SO-W), one each for obtaining values for W, V and U assuming a 3 stage limit.

Figure 4A:
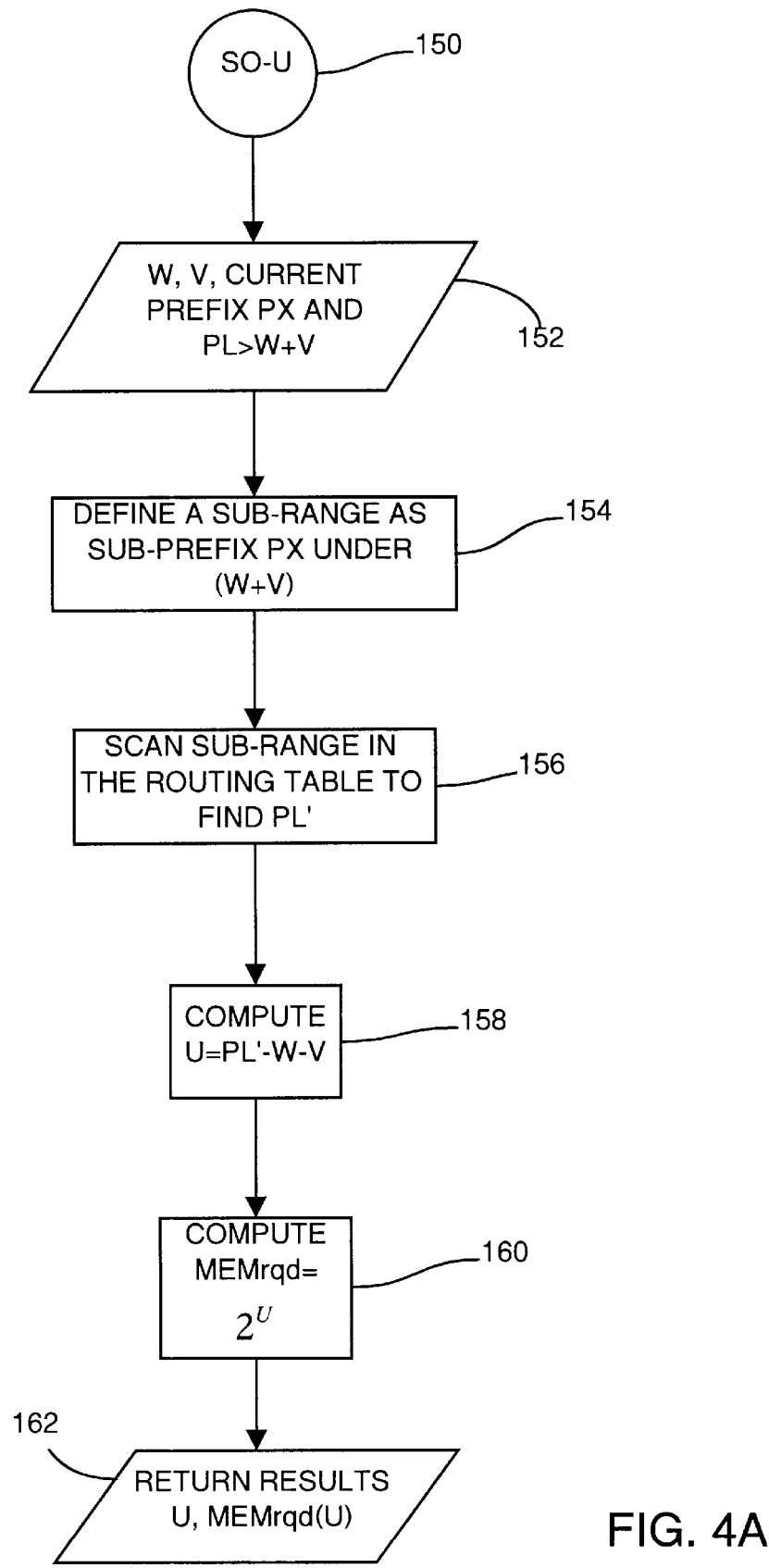
FIGS. 4A–E illustrates a flow chart of a forwarding table memory optimization process according to an embodiment of the present invention.

Sub-range-Optimizer for U (SO-U) 150-FIG. 4A

The values of W, V, and a current prefix PX and the fact that PL is greater than W+V are used as input parameters to the process at step 152 based on previous processing. The sub-range is defined at step 154 as the sub-prefix PX under (W+V) as discussed above.

The sub-range (defined in step 154) in the routing table is scanned to find the longest prefix of prefix length PL' at step 156. The value of U is calculated as PL'−W−V at step 158.

The memory required for $3^{rd}$ stage tables is calculated at step 160 as MEMrqd(U)=$2^U$. These results (U and MEMrqd (U)) is returned to a calling process at step 162. This will become evident in the subsequent discussion regarding the other sub-range-optimizer processes.

Figure 4B:
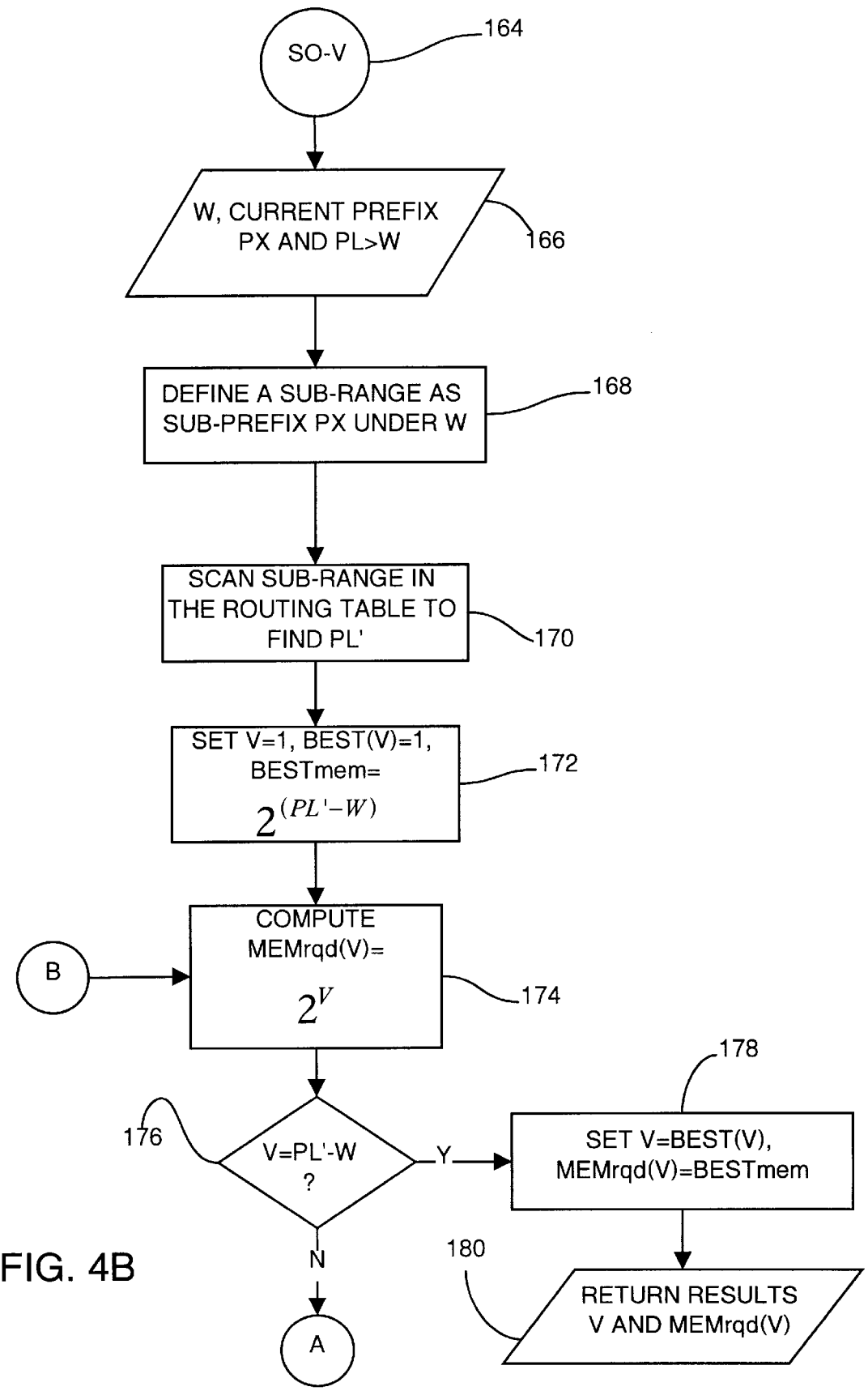

Sub-range-Optimizer for V (SO-V) 164-FIG. 4B

The values of W and a current prefix PX and the fact that PL is greater than W are used as input parameters to the process at step 166 based on previous processing. The sub-range is defined at step 168 as the sub-prefix PX under W as discussed above.

The sub-range (defined in step 168) in the routing table is scanned to find the longest prefix of prefix length PL' at step 170. Working variables are initialized at step 172: V=1, BEST(V)=1, BESTmem=$2^{(PL'-W)}$; where V is the width of a second stage table, BEST(V) is a value of V that yields the optimal memory, and BESTmem is a value representing the optimal memory.

The memory required for $2^{nd}$ stage tables is calculated at step 174 as MEMrqd(V)=$2^V$.

If the value of V is equal to PL'−W (as determined at step 176) then the value of V is set to BEST(V), the best value for V found in this process, and MEMrqd(V) is set to BESTmem, the corresponding lowest memory equal to V at step 178. These results (V, MEMrqd(V)) are returned to a calling process at step 180. This will become evident in the subsequent discussion regarding the other sub-range-optimizer processes.

Figure 4C:
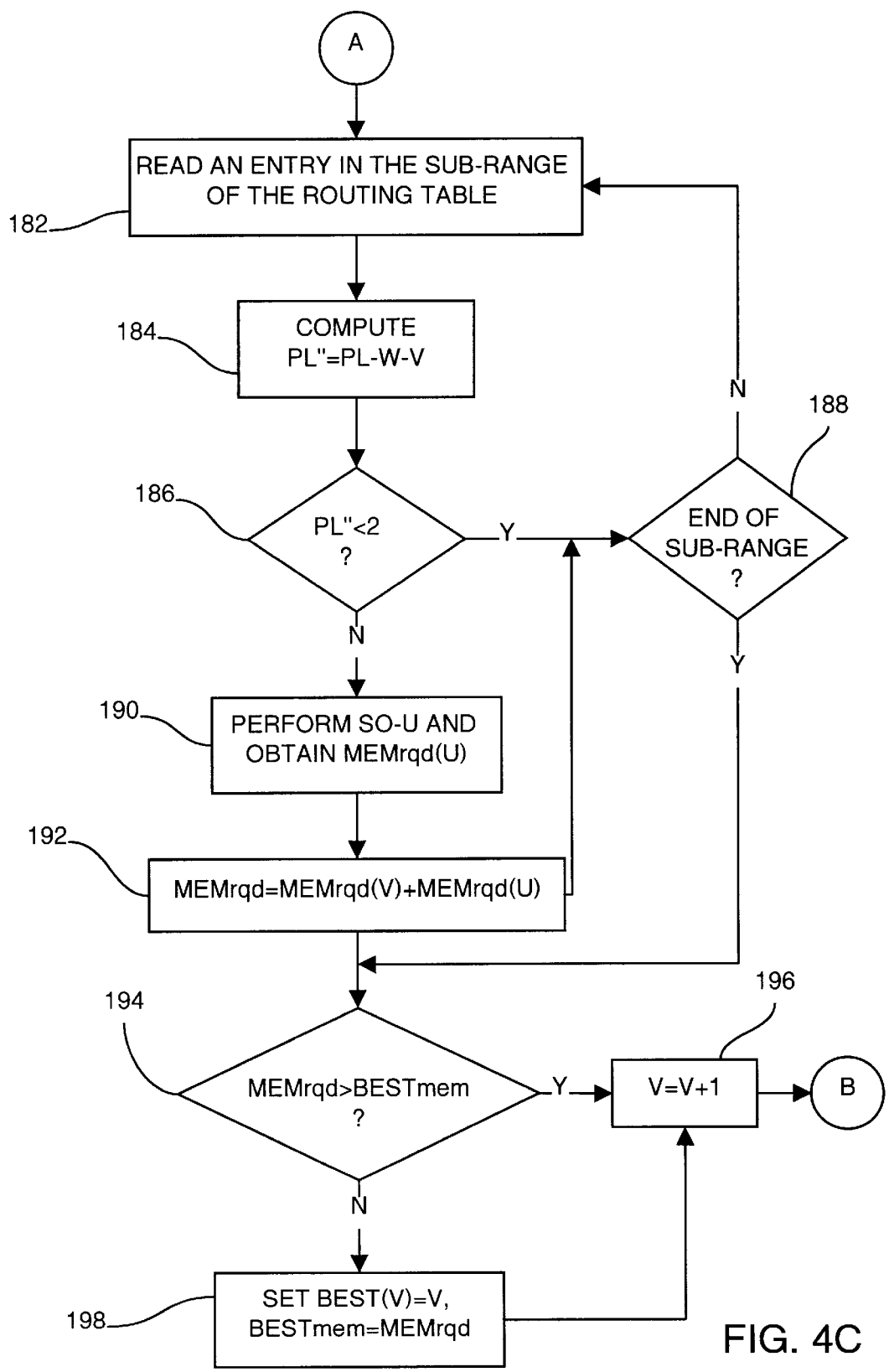

If the value of V is not equal to PL'−W (as determined at step 176) then processing continues to block 182 in FIG. 4C.

An entry in the sub-range (as defined in step 168) of the routing table is read at step 182. The value of a modified PL is calculated at step 184 as PL"=PL−W−V.

If PL" is less than two then processing passes to block 188 to determine if the end of the sub-range has been reached: if not processing returns to step 182 to read and process another entry in the sub-range of the routing table; if the end of the sub-range has been reached processing proceeds to step 194, which is described below.

If PL" is not less than two then processing continues to step 190 where the SO-U 150 process is performed to obtain MEMrqd(U). A cumulative memory requirement total (MEMrqd) is calculated at step 192 as MEMrqd=MEMrqd (V)+MEMrqd(U). Processing passes to block 188 to determine if the end of the sub-range has been reached: if not processing returns to step 182 to read and process another entry in the sub-range of the routing table; if the end of the sub-range has been reached processing proceeds to step 194.

The current memory requirement total (MEMrqd) is compared with the current optimal memory total (BESTmem) at step 194. If the value of MEMrqd is greater than the value of BESTmem then the value of V is incremented by one at step 196 and processing returns to step 174 (FIG. 4B) to calculate a new memory requirement.

If the value of MEMrqd is not greater than the value of BESTmem then BEST(V) is set equal to V and BESTmem is set equal to MEMrqd at step 198 and processing passes to step 196.

Figure 4D:
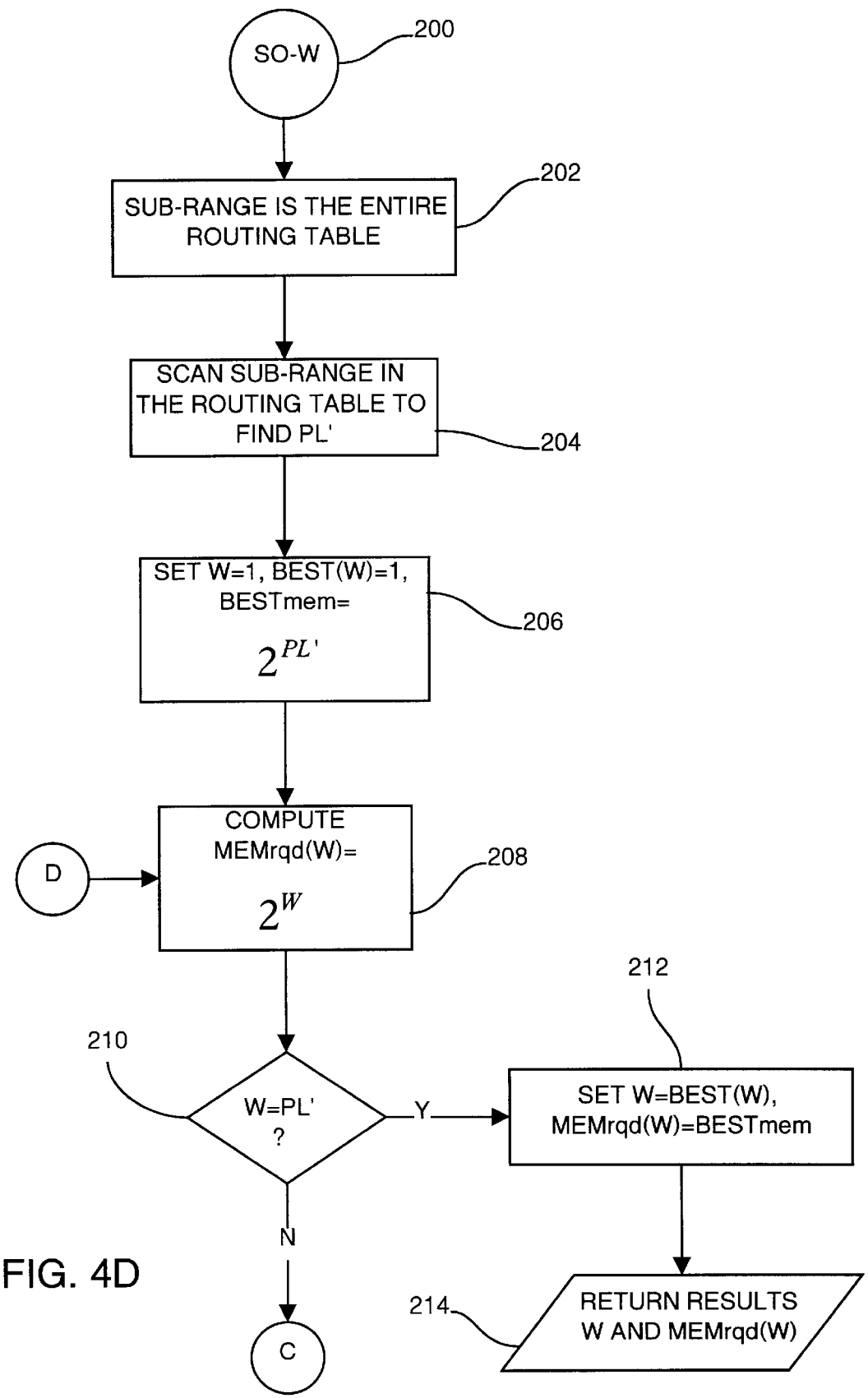

Sub-range-Optimizer for W (SO-W) 200-FIG. 4D

The sub-range is defined at step 202 as the entire routing table.

The sub-range (defined in step 202) is scanned to find the longest prefix of prefix length PL' at step 204. Working variables are initialized at step 206: W=1, BEST(W)=1, BESTmem=$2^{PL'}$; where W is the width of a first stage table, BEST(W) is a value of W that yields the optimal memory, and BESTmem is a value representing the optimal memory.

The memory required for $1^{st}$ stage table is calculated at step 208 as MEMrqd(W)=$2^W$.

If the value of W is equal to PL' (as determined at step 210) then the value of W is set to BEST(W), the best value for W found in this process, and MEMrqd(W) is set to BESTmem, the corresponding lowest memory requirement at step 212. These results (BEST(W), BESTmem, and MEMrqd(W)) are returned to a calling process at step 214.

Figure 4E:
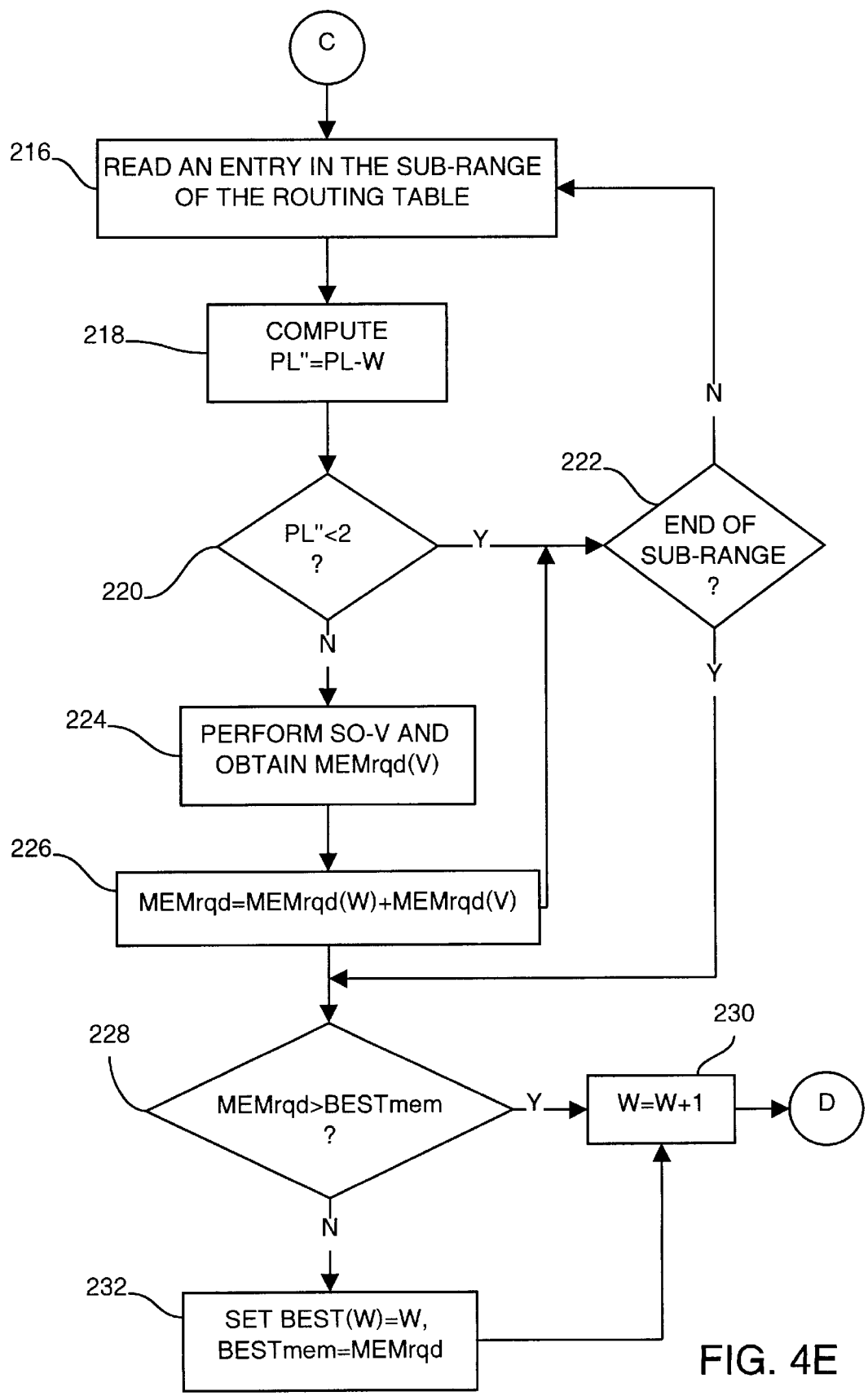

If the value of W is not equal to PL' (as determined at step 210) then processing continues to block 216 in FIG. 4E.

An entry in the sub-range (as defined in step 202) of the routing table is read at step 216. The value of a modified PL is calculated at step 218 as PL"=PL−W.

If the value of PL" is less than two then processing passes to block 222 to determine if the end of the sub-range has been reached: if not processing returns to step 216 to read and process another entry in the sub-range of the routing table; if the end of the sub-range has been reached processing proceeds to step 228, which is described below.

If the value of PL" is not less than two then processing continues to step 224 where the SO-V 164 process is performed to obtain MEMrqd(V). Although the 50-V 164 process also returns a best value for V, this value is not used in the present process that only deals with optimizing the total memory requirements. The values of V will be used during the construction of the actual tables, when values for V are selected directly. A cumulative memory requirement total (MEMrqd) is calculated at step 226 as MEMrqd= MEMrqd(W)+MEMrqd(V). Processing passes to block 222 to determine if the end of the sub-range has been reached: if not processing returns to step 216 to read and process another entry in the sub-range of the routing table; if the end of the sub-range has been reached processing proceeds to step 228.

The current memory requirement total (MEMrqd) is compared with the current optimal memory total (BESTmem) at step 228. If the value of MEMrqd is greater than the value of BESTmem then the value of W is incremented by one at step 230 and processing returns to step 208 (FIG. 4D) to calculate a new memory requirement.

If the value of MEMrqd is not greater than the value of BESTmem then BEST(W) is set equal to W and BESTmem is set equal to MEMrqd at step 232 and processing passes to step 230.

Address Translation

The look-up/address translation method of the present invention will be described in conjunction with the block diagram of FIG. 5 and the flow chart of FIGS. 6A and 6B. In general, the object of the look-up/address translation method is to translate an X-bit address to a resource index RI (e.g. target information, port, queue etc.). The forwarding table data structure based on a given routing table has been created as discussed above. In this discussion, it is assumed that three stages of tables were created.

As previously discussed, the forwarding tables in each stage contain a plurality of action records [Ptr,Al]: (1) a null/empty record [0,0], (2) an resource record [RI,0, or (3) a pointer record [table,width].

Stage 1

Address a first stage table T0 using the first most significant A bits of an X-bit address 240 as an offset OS1 into the table T0 at step 250. If the entry (at offset OS1 of table T0) is a null record [0,0], as determined at step 252, then a default resource is assigned or the address 240 is discarded at step 254.

If the entry (at offset OS1 of table T0) is a resource record [RI,0], as determined at step 256, then the address 240 has been successfully translated to a resource at step 258. This situation is illustrated in path 242 of FIG. 5 where the resource record is [RI,0].

If the result of the decision block 256 is negative then the entry (at offset OS1 of table T0) is a pointer record [table, width] (step 260). This situation is illustrated in path 244 of FIG. 5 where the pointer record is [T1, B1].

Stage 2

For processing path 244 (pointer record [T1, B1] to another table), a second offset OS2 representing the next B1 bits of the X-bit address 240 after the first A bits is used as an address into the second stage table T1 (i.e. the table pointed to by the pointer record addressed in table T0) at step 262.

If the entry (at offset OS2 of table T1) is a null record [0,0], as determined at step 264, then a default resource is assigned or the address is discarded at step 266.

If the entry (at offset OS2 of table T1) is a resource record [RI,0], as determined at step 258, then the address 240 has been successfully translated to a resource at step 270. This situation is illustrated in path 246 of FIG. 5 where the resource record is [RI,0].

If the result of the decision block 268 is negative then the entry (at offset OS2 of table T1) is a pointer record [table, width] (step 272). This situation is illustrated in path 248 of FIG. 5 where the pointer record is [Tn+2, C2].

Stage 3

For processing path 248 (pointer record [Tn+2, C2] to another table), a third offset OS3 representing the next C2 bits of the X-bit address 240 after the first A+B1 bits is used as an address into the third stage table Tn+2 (i.e. the table pointed to by the pointer record addressed in table T1) at step 274. Since, this example is limited to three stages, each entry in table Tn+2 contains either a null record or a resource record, no further pointer records are possible.

If the entry (at offset OS3 of table Tn+2) is a null record [0,0], as determined at step 276, then a default resource is assigned or the address is discarded at step 278.

If the entry (at offset OS3 of table Tn+2) is a resource record [RI,0], as determined at step 280, then the address 240 has been successfully translated to a resource at step 282.

If the result of the decision block 280 is negative then this would imply that the table entry is a pointer record to a forth stage table. Since, in the present example, only three stages are provided, this would not arise in practice. The path to 284 is provided for illustration purposes only. A practical implementation of the address translation method can be made cyclical to allow an arbitrary number of stages of tables, and the search will always terminate on either a NULL entry (254, 266, 278) or a resource record (258, 270, 282).

Modified Offset Addressing of Tables

In a more general case, where other protocols need to be translated (e.g. for quality of service—QoS reasons), the bits of the address may not be in a contiguous block. Further, they may be in different fields, depending on the previous lookup.

To accommodate this variation in the creation of the forwarding table data structure of the present invention an additional field indicating an offset (OS) would be added to the action record [Ptr,Al].

Consequently, a new action record is represented as: [Ptr,Al,OS].

There are three possible forms of the new action record according to an embodiment of the present invention:

(1) null/empty record: [Ptr,Al,OS]=[0,0,0], where the record indicates that no match is available (use either a default resource index or discard);

(2) resource record: [Ptr,Al,OS]=[RI,0,0], where the record provides the required target information (from RI field); and (3) pointer record: [Ptr,Al,OS]=[table,width,offset], where an address (using width and offset fields) to a subsequent table (using table field) is required to translate the prefix.

For example, action record [table,width,offset]=[T1,4,3] would represent address table T1 using the next 4 bits after the first W+offset=W+3 bits of the prefix.

Figure 5:
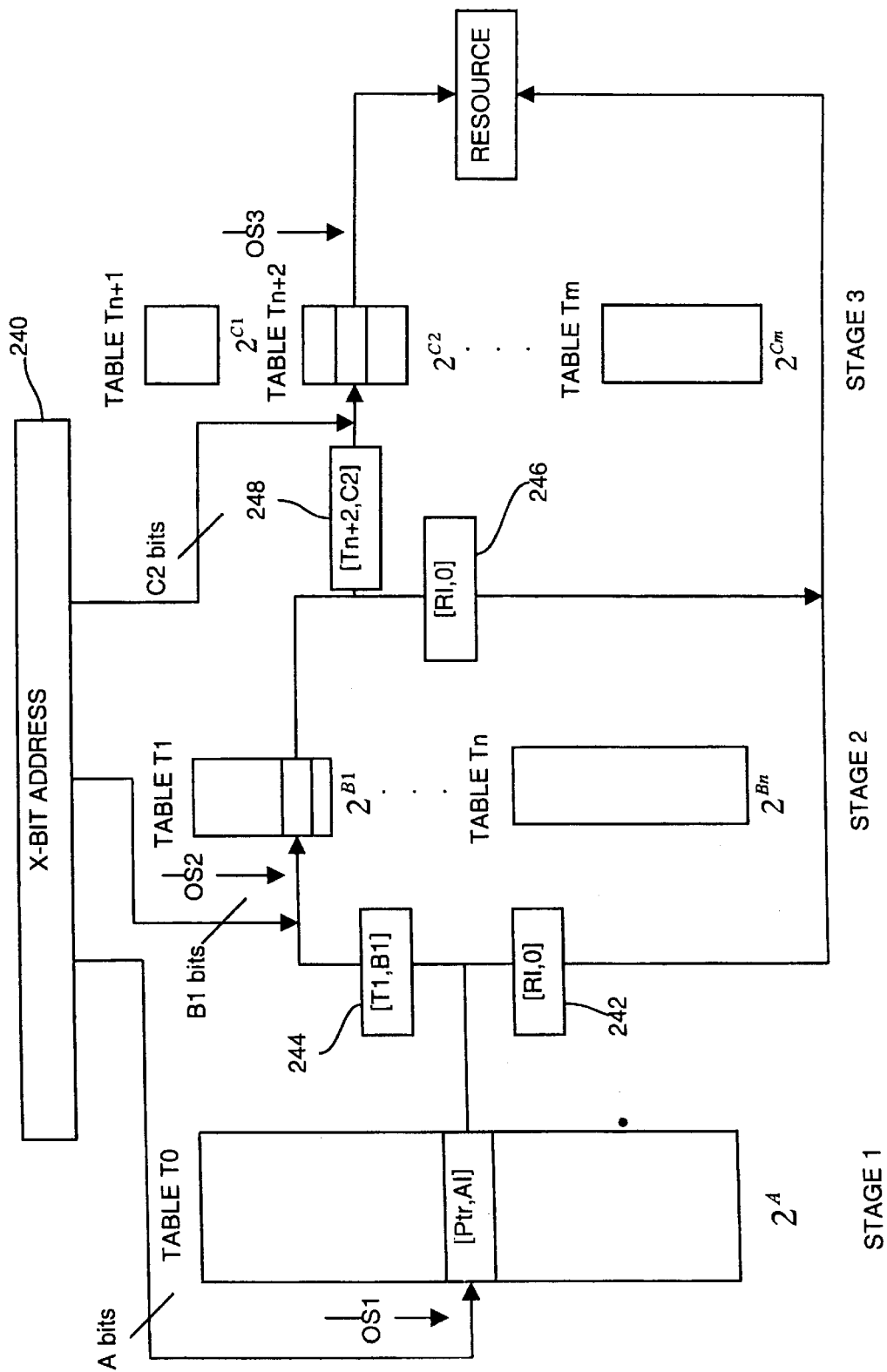
FIG. 5 illustrates a block diagram of address translation according to an embodiment of the present invention.
Figure 6A:
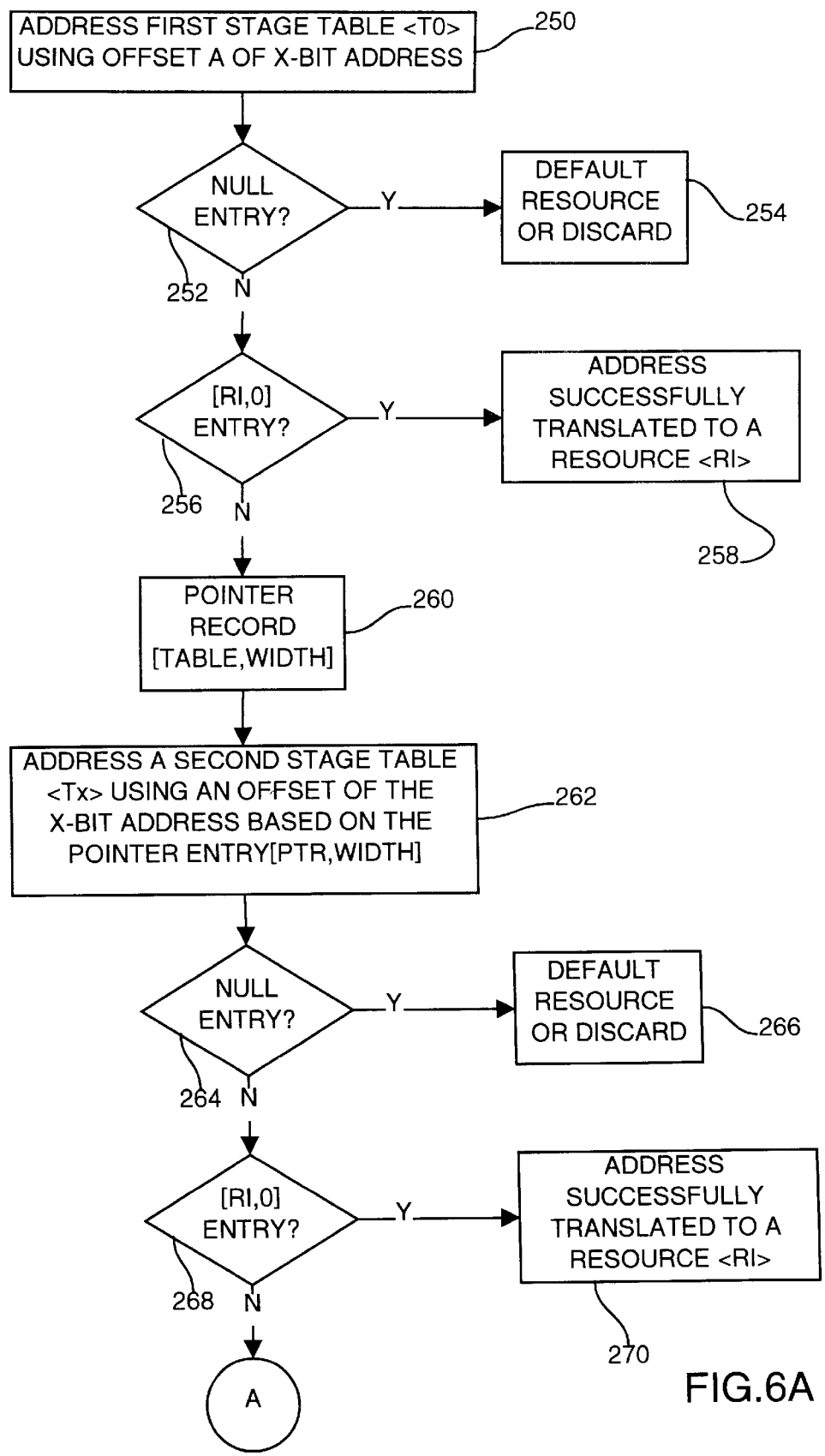
FIGS. 6A, 6B illustrate flow charts of the address translation method of the present invention.
Figure 6B:
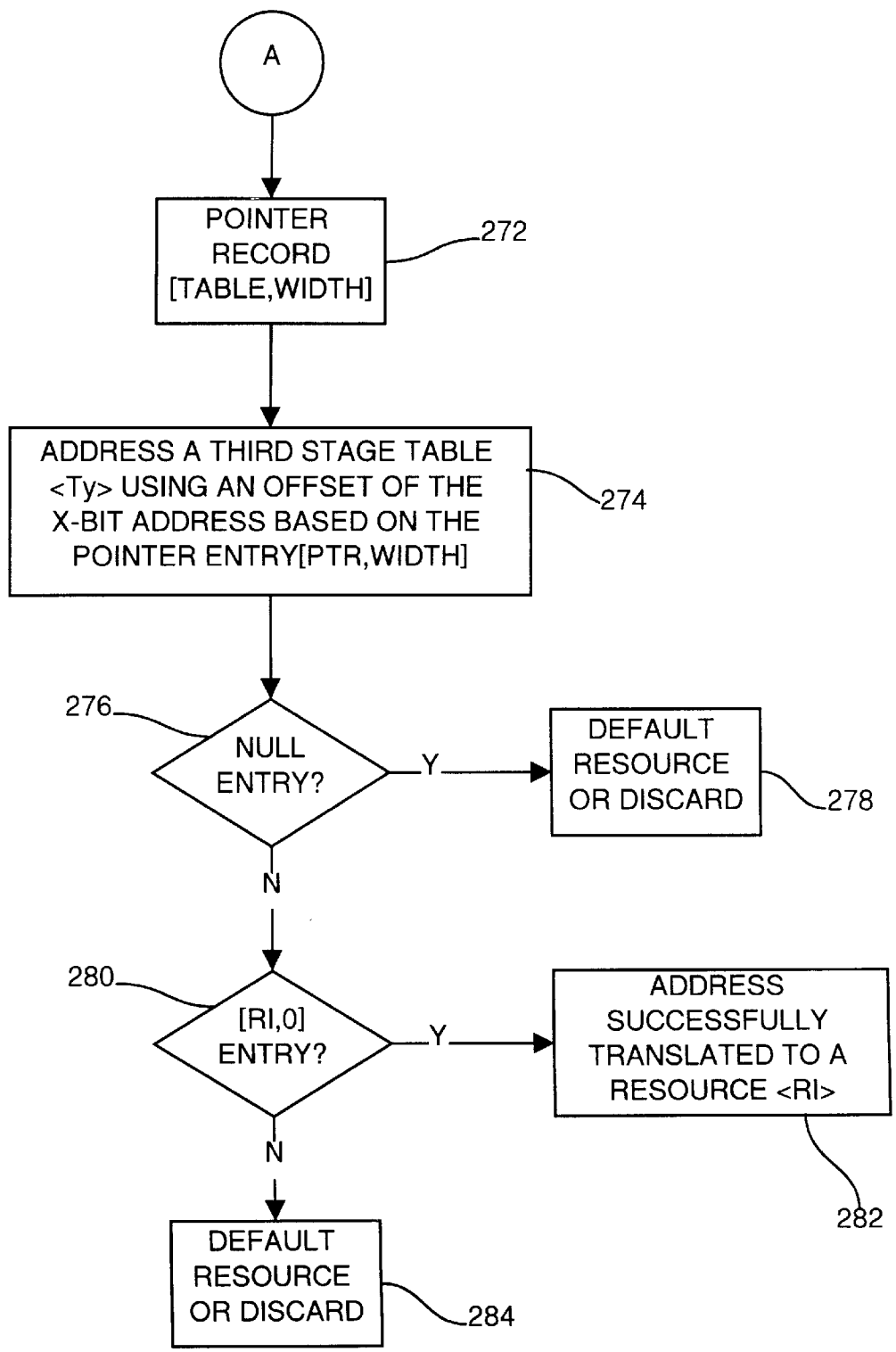
Figure 7:
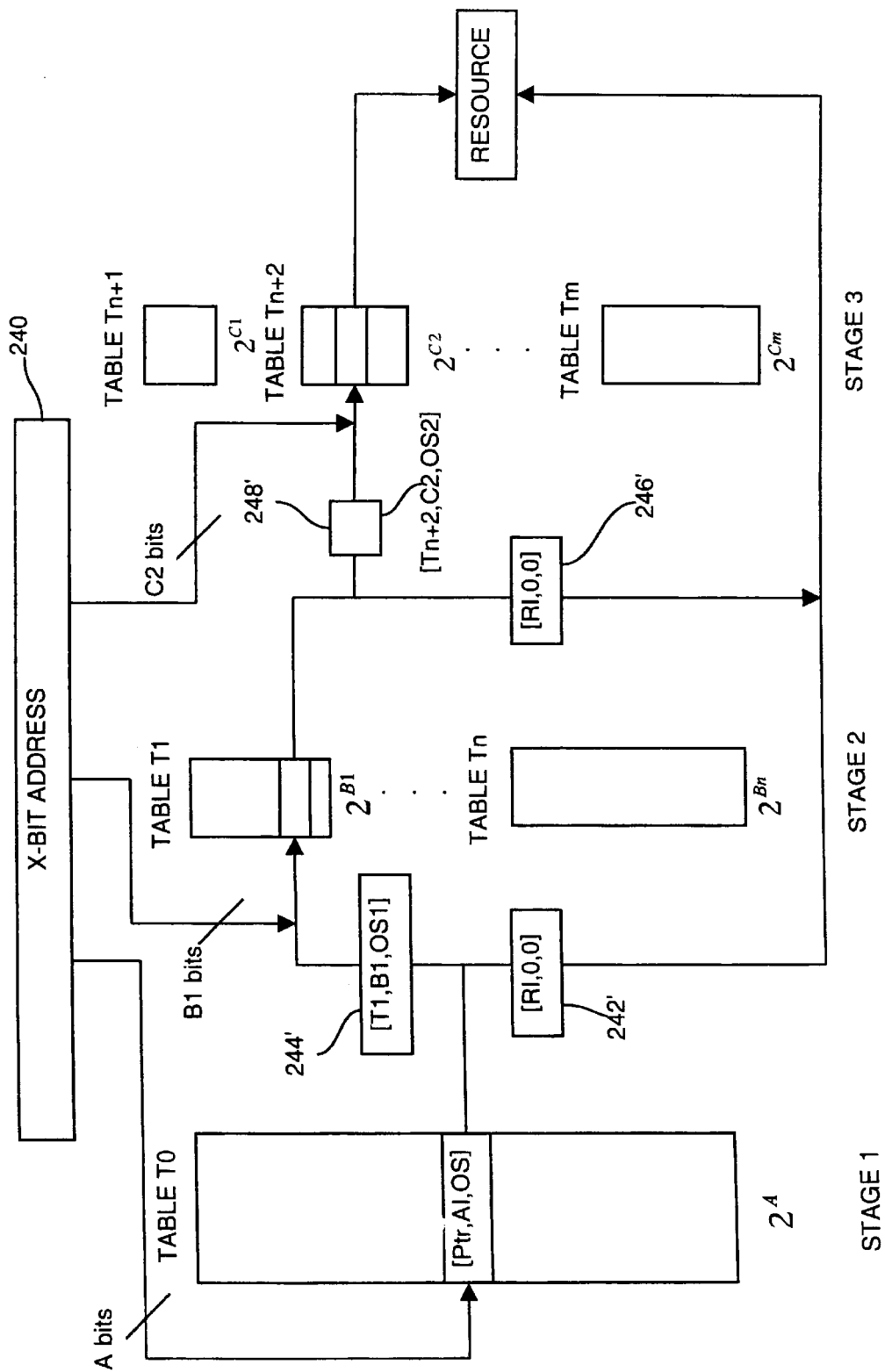
FIG. 7 illustrates a block diagram of address translation according to another embodiment of the present invention.

FIG. 7 illustrates a modified version of FIG. 5 illustrating the translation method using the new action record [Ptr,Al, OS]. The process is generally identical with the exception of changes to subsequent table addressing shown by modified paths 244" and 248'. In particular, for path 244' table T1 is addressed with the next B1 bits after the first A+OS1 bits of the prefix, and for path 248' table Tn+2 is addressed with the next C2 bits after the first A+OS2 bits of the prefix.

Truncation of Forwarding Tables

FIG. 8 illustrates a truncation of non-full forwarding tables according to an additional feature of the present invention. A complete stage one forwarding table 300 includes a series of consecutive empty entries, from X to $2^A$. In order to further reduce memory requirements the empty entries in the table can be truncated to form a truncated stage 1 forwarding table 302. If an offset address is in the range of X to $2^A$ the output is either a default resource or the prefix is discarded in the same manner as addressing a null [0,0] entry in a complete table.

The value of X is indicated by another field in a [table, width, xx] record that points to the forwarding table, where xx can be expressed as: $2^{xx}$=X or xx=X.

Address Translation System

Figure 9:
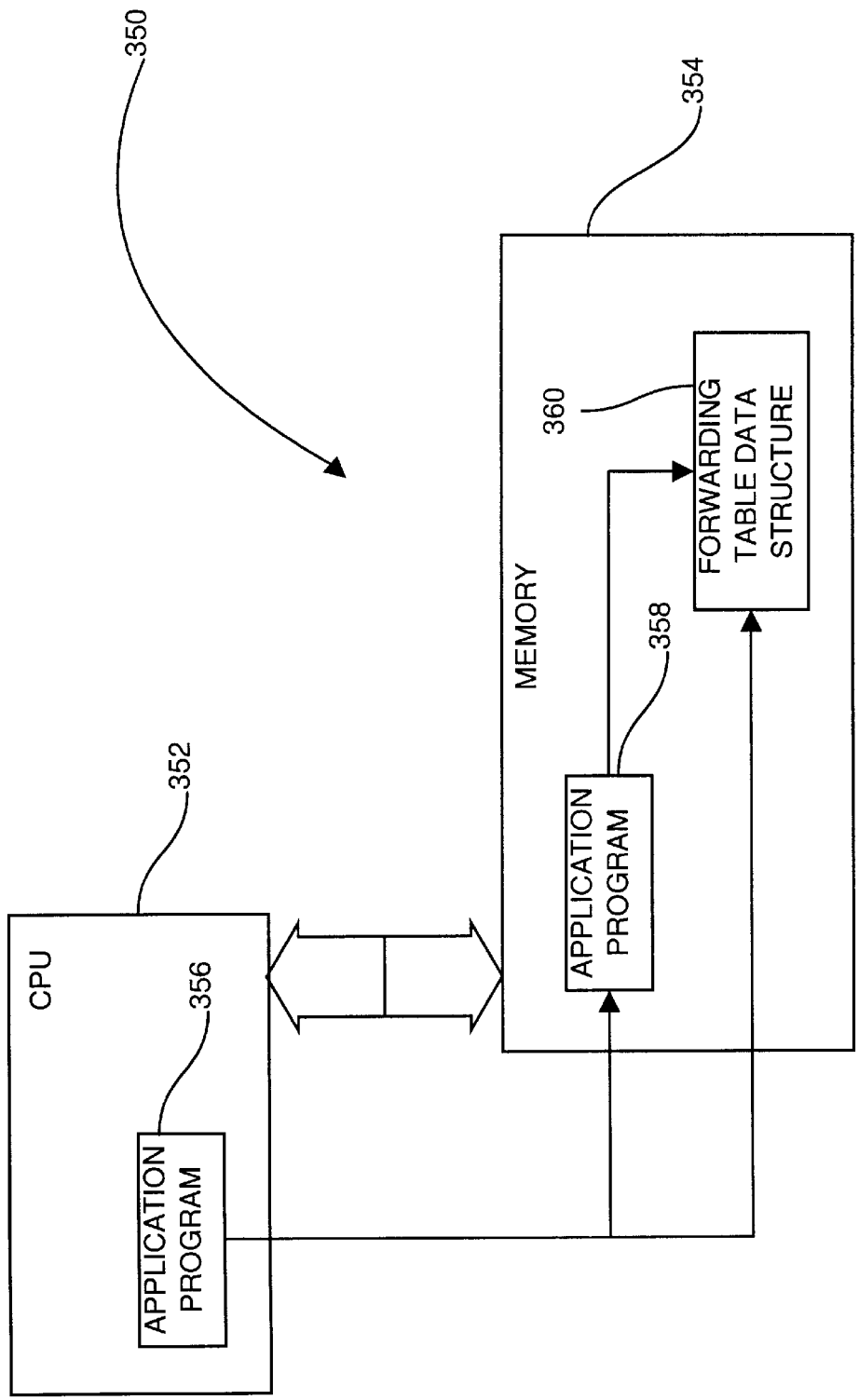
FIG. 9 illustrates a block diagram an address translation system according to an embodiment of the present invention.

FIG. 9 shows a diagram of an address translation system 350 including a central processing unit (CPU) 352 and a memory 354. The CPU 352 can be any standard and commonly known central processing unit, and memory 354 can include magnetic core, semiconductor RAM, magnetic disks and magnetic tapes, or any other known memory device. The CPU 352 can also represent several independently running central processing units that may be executing application programs simultaneously. As shown in FIG. 9, application programs 356 and 358 can be executed by the CPU 352.

In accordance with the present invention, application programs 356 and 358 share a forwarding table data structure 360 that is stored in memory blocks according to the structure described above.

EXAMPLE 1

A detailed step-by-step example using a sample "routing" table is provided below to illustrate how the forwarding table data structures are built.

| ROUTING TABLE | | |
|---|---|---|
| PREFIX | PREFIX LENGTH | RESOURCE INDEX |
| 010100 | 4 | Y |
| 100000 | 2 | X |
| 101100 | 4 | Z |
| 110000 | 3 | Y |
| 110100 | 4 | Y |
| 110110 | 5 | X |
| 111010 | 5 | Z |

STEP 1
  set W=3.
STEP 2
  create a first stage table T0 of size $2^W=2^3=8$
  a representation of the table T0 for illustrative purposes is provided below

| FIRST STAGE TABLE T0 | | | | | | | |
|---|---|---|---|---|---|---|---|
| 000 | 001 | 010 | 011 | 100 | 101 | 110 | 111 |

STEP 3-1$^{st}$ Read
  read the first route entry from the routing table.
    [010100/4/Y], [prefix/prefix length/resource index]
STEP 4
  compute offset A=010 (first 3 bits (W=3) of prefix)
STEP 5
  since PL=4>W=3 and entry at offset A=010 is empty:
    choose a second stage table width of V=2
    create a second stage table T1 of size equal to $2^V=2^2=4$

| SECOND STAGE TABLE T1 | | | |
|---|---|---|---|
| 00 | 01 | 10 | 11 |

STEP 6
  create a data record containing a pointer to the second stage table T1 and an action indicator equal to the second table width V=2
  data record: [Ptr,AI]=[T1,2]
  store data record at the offset A=010 in the first stage table T0

| FIRST STAGE TABLE T0 | | | | | | | |
|---|---|---|---|---|---|---|---|
| 000 | 001 | 010 [T1,2] | 011 | 100 | 101 | 110 | 111 |

STEP 7
  compute offset B=10 (the next V=2 bits of prefix following first W=3 bits)
STEP 8
  since PL−W=1<V=2:
    create a data record [RI,AI]=[Y,0]
    store data record at offset B=10 in the second stage table T1 and at P subsequent locations where $P=2^{V-(PL-W)}-1=2^{2-(4-3)}-1=1$

| SECOND STAGE TABLE T1 | | | |
|---|---|---|---|
| 00 | 01 | 10 [Y,0] | 11 [Y,0] |

STEP 3-2$^{nd}$ Read
  read the second route entry from the routing table.
    [100000/2/X], [prefix/prefix length/resource index]
STEP 4
  compute offset A=100 (first 3 bits (W=3) of prefix)
STEP 5
  since PL=2<W=3:
    create data record: [RI,AI]=[X,0].
    store data record at the offset A=100 and at P subsequent locations in the first stage table T0 where $P=2^{W-P}-1=2^{3-2}-1=1$

| FIRST STAGE TABLE T0 | | | | | | | |
|---|---|---|---|---|---|---|---|
| 000 | 001 | 010 [T1,2] | 011 | 100 [X,0] | 101 [X,0] | 110 | 111 |

STEP 3-3$^{rd}$ Read
  read the third route entry from the routing table.
    [101100/4/Z], [prefix/prefix length/resource index]
STEP 4
  compute offset A=101 (first 3 bits (W=3) of prefix)
STEP 5
  since PL=4>W=3 and the offset A=101 of the first stage table T0 is occupied with a data record [RI,AI]=[X,0]:
    select another second stage table T2 of width V
    set V=1 (this is an arbitrary choice for this example)
    create the second stage table T2 of size $2^V=2^1=2$
    fill the second stage table T2 with the data record [RI,AI] from the offset A=101 in the first stage table T0

| SECOND STAGE TABLE T2 | |
|---|---|
| 0 [X,0] | 1 [X,0] |

STEP 6
  create a data record [Ptr,AI]=[T2,V]=[T2,1]
  store the data record at offset A=101 in the first stage table T0, notice that the previous record [X,0] is overwritten at offset A=101

| FIRST STAGE TABLE T0 | | | | | | | |
|---|---|---|---|---|---|---|---|
| 000 | 001 | 010 [T1,2] | 011 | 100 [X,0] | 101 [T2,1] | 110 | 111 |

STEP 7
  compute offset B=1 (next V=1 bit of prefix after W bits)

STEP 8
  since PL−W=4−3=V=1:
    create a data record [RI,AI]=[Z,0]
    store at offset B=1 in second stage table T2

| SECOND STAGE TABLE T2 | |
|---|---|
| 0 | 1 |
| [X,0] | [Z,0] |

STEP 3-4$^{th}$ Read
  read the fourth route entry from the routing table.
    [110000/3/Y], [prefix/prefix length/resource index]
STEP 4
  compute offset A=110 (first W=3 bits of prefix)
STEP 5
  since PL=3=W:
    create data record [RI,AI]=[Y,0]
    store at offset A=110 in first stage table T0

| FIRST STAGE TABLE T0 | | | | | | | |
|---|---|---|---|---|---|---|---|
| 000 | 001 | 010 | 011 | 100 | 101 | 110 | 111 |
|  |  | [T1,2] |  | [X,0] | [T2,1] | [Y,0] |  |

STEP 3-5$^{th}$ Read
  read the fifth route entry from the routing table.
    [110100/4/Y], [prefix/prefix length/resource index]
STEP 4
  compute offset A=110 (first W=3 bits of prefix)
STEP 5
  since PL=4>W=3 and the offset A=110 of the first stage
    table T0 is occupied with a data record [RI,AI]=[Y,0]:
    select another second stage table T3 of width V
    set V=2 (this is an arbitrary choice for this example)
    create the second stage table T3 of size $2^V=2^2=4$
    fill the second stage table T3 with the data record
      [RI,AI]=[Y,0] from the offset A=110 in the first stage
      table T0

| SECOND STAGE TABLE T3 | | | |
|---|---|---|---|
| 00 | 01 | 10 | 11 |
| [Y,0] | [Y,0] | [Y,0] | [Y,0] |

STEP 6
  create a data record [Ptr,V]=[T3,2]
    store at offset A=110 in the first stage table T0, notice that
      the previous record at offset A=110 was overwritten

| FIRST STAGE TABLE T0 | | | | | | | |
|---|---|---|---|---|---|---|---|
| 000 | 001 | 010 | 011 | 100 | 101 | 110 | 111 |
|  |  | [T1,2] |  | [X,0] | [T2,1] | [T3,2] |  |

STEP 7
  compute offset B=10 (next V=2 bits of prefix after W bits)
STEP 8
  since PL−W=4−3=1<V=2 (for second stage table T3)
    create data record [RI,AI]=[Y,0]
    store at offset B=10 in second stage table T3
    store a copy of record in P subsequent locations where $P=2^{V-(PL-W)}-1=2^{2-(4-3)}-1=1$ notice that in the present example, the 5$^{th}$ route specification in the routing table is redundant since the 4$^{th}$ route (110xxx) with the shorter prefix selects the same resource as the 5$^{th}$ route (1101xx).

| SECOND STAGE TABLE T3 | | | |
|---|---|---|---|
| 00 | 01 | 10 | 11 |
| [Y,0] | [Y,0] | [Y,0] | [Y,0] |

STEP 3-6$^{th}$ Read
  read the sixth route entry from the routing table.
    [110110/5/X], [prefix/prefix length/resource index]
STEP 4
  compute offset A=110 (first W=3 bits of prefix)
STEP 5
  since PL=5>W=3 and the offset A=110 contains a record
    pointing to another table [Ptr,V]=[T3,2]:
    skip step 6 and proceed to step 7
STEP 7
  compute offset B=11 (the next V=2 bits of the prefix
    following the first W=3 bits)
STEP 8
  since (PL=5)−(W=3)=(V=2):
    create data record [RI,AI]=[X,0]
    store at offset B=11 in second stage table T3
  notice that a previous route was overwritten with the 6$^{th}$
    route that specializes the previous prefix of the 4$^{th}$ and
    5$^{th}$ routes, this illustrates why it is necessary to process
    the route table in sorted order

| SECOND STAGE TABLE T3 | | | |
|---|---|---|---|
| 00 | 01 | 10 | 11 |
| [Y,0] | [Y,0] | [Y,0] | [X,0] |

STEP 3-7$^{th}$ Read
  read the seventh (and last) route entry from the routing
    table.
    [111010/5/Z], [prefix/prefix length/resource index]
STEP 4
  compute offset A=111 (first W=3 bits of prefix)
STEP 5
  since PL=5>W=3 and the first stage table T0 entry at
    offset A=111 is empty:
    select another second stage table T4 of width V
    set V=3 (this is an arbitrary choice for this example)
    create the second stage table T4 of size $2^V=2^3=8$

| SECOND STAGE TABLE T4 | | | | | | | |
|---|---|---|---|---|---|---|---|
| 000 | 001 | 010 | 011 | 100 | 101 | 110 | 111 |

STEP 6 create a data record [Ptr,V]=[T4,3]
store at offset A=111 in the first stage table T0

| FIRST STAGE TABLE T0 | | | | | | | |
|---|---|---|---|---|---|---|---|
| 000 | 001 | 010 [T1,2] | 011 | 100 [X,0] | 101 [T2,1] | 110 [T3,2] | 111 [T4,3] |

STEP 7 compute offset B=010 (the next V=3 bits of the prefix after the first W=3 bits)

STEP 8 since PL−W=5−3=2<V=3 (for second stage table T4):
 create data record [RI,Al]=[Z,0]
 store at offset B=010 in second stage table T4
 store a copy of record in P subsequent locations where
 $P=2^{V-(PL-W)}-1=2^{3-(5-3)}-1=1$

| SECOND STAGE TABLE T4 | | | | | | | |
|---|---|---|---|---|---|---|---|
| 000 | 001 | 010 [Z,0] | 011 [Z,0] | 100 | 101 | 110 | 111 |

RESULTING FORWARDING TABLES

The result of one (non-memory optimized) build of the forwarding table data structure based on a seven record routing table is provided below. In this example five tables were constructed (one at the first stage and four at the second stage).

| FIRST STAGE TABLE T0 | | | | | | | |
|---|---|---|---|---|---|---|---|
| 000 | 001 | 010 [T1,2] | 011 | 100 [X,0] | 101 [T2,1] | 110 [T3,2] | 111 [T4,3] |

| SECOND STAGE TABLE T1 | | | |
|---|---|---|---|
| 00 | 01 | 10 [Y,0] | 11 [Y,0] |

| SECOND STAGE TABLE T2 | |
|---|---|
| 0 [X,0] | 1 [Z,0] |

| SECOND STAGE TABLE T3 | | | |
|---|---|---|---|
| 00 [Y,0] | 01 [Y,0] | 10 [Y,0] | 11 [X,0] |

| SECOND STAGE TABLE T4 | | | | | | | |
|---|---|---|---|---|---|---|---|
| 000 | 001 | 010 [Z,0] | 011 [Z,0] | 100 | 101 | 110 | 111 |

EXAMPLE 2

A detailed step-by-step example using routing entries from the sample "routing" table provided in Example 1 is provided below to illustrate the address translation method of the present invention using the forwarding table data structures created in Example 1.

(A) Translate Host Address: 110000
 (route entry 4 of routing table with resource index Y)
 Note that the PL is not relevant here. The host address is translated to a resource index. The fact that the route has a PL=3 is implied in the forwarding table data structure, and it means that host address bits beyond PL are ignored by the route translation process.
 (1) address first stage table T0 at offset=110
  first W=3 bits of prefix (i.e. host address)
 (2) offset 110 of table T0 contains a pointer record [T3,2]
 (3) address second stage table T3 at offset=00
  next 2 bits of prefix after first 3 bits
 (4) offset 00 of table T3 contains a resource record [Y,0]
 (5) processing complete
The same result would occur for host address 110010 where the offset=01 would contain the same resource record [Y,0].
(B) Translate Host Address: 110110
 (route entry 6 of routing table with resource index X)
 (1) address first stage table T0 at offset=110
  first W=3 bits of prefix (i.e. host address)
 (2) offset 110 of table T0 contains a pointer record [T3,2]
 (3) address second stage table T3 at offset=11
  next 2 bits of prefix after first 3 bits
 (4) offset 11 of table T3 contains a resource record [X,0]
 (5) processing complete
The same result would occur for host address 110111 where the offset=11 would contain the same resource record [X,0].
(C) Translate Host Address: 011000
 (not in routing table)
 (1) address first stage table T0 at offset=011
  first W=3 bits of prefix (i.e. host address)
 (2) offset 011 of table T0 contains an empty record [0,0]
 (3) discard address or assign default resource index
 (4) processing complete
The following addresses would also translate to NULL [0,0]: 011001; 011010; 011011 . . . 011111.
(D) Translate Host Address: 100000
 (route entry 2 of routing table with resource index X)
 (1) address first stage table T0 at offset=100
  first W=3 bits of prefix (i.e. host address)
 (2) offset 100 of table T0 contains a resource record [X,0]
 (3) processing complete
The following addresses would also translate to [X,0]: 100001; 100010; 100011, 100100.
 What is claimed is:
 1. A method of creating a forwarding table data structure for access by an application program, said application program being executed by a data processor that creates said data structure in a memory coupled to the data processor, said forwarding table data structure being created from a routing table sorted in ascending order, said routing table including a plurality of route entries where each route entry contains a prefix representing an address, a prefix length (PL) and a resource index, and said method comprising the steps, executed by said data processor, of:

(a) selecting a width W for a first stage table;

(b) creating the first stage table of a size equal to $2^W$;

(c) reading a route entry from the routing table;

(d) computing an offset from the W first bits of the prefix of the route entry read at step (c);

(e) when the prefix length of the route entry is the same as the width W of the first stage table, creating a resource record containing the resource index of the route entry and an action indicator of zero and storing the resource record at the offset of the first stage table;

(f) when the prefix length of the route entry is less than the width W of the first stage table, creating a resource record containing the resource index of the route entry and an action indicator of zero and storing the record at the offset in the first stage table T0 and at $2^{W-PL}-1$ subsequent locations in the first stage table following the offset;

(g) when the prefix length of the route entry is greater than the width W of the first stage table selecting a width V for a second stage table, creating the second stage table of a size equal to $2^V$, creating a pointer record including a pointer to the second stage table and an action indicator equal to the width V of the second stage table, and storing the pointer record at the offset in the first stage table; and (h) returning to step (c) until each route entry in the routing table has been read once.

2. The method of claim 1, wherein the values of W and V are selected to optimize memory requirements of the data structure.

3. The method of claim 2, wherein the values of W and V are positive integers.

4. The method of claim 3, further comprising the following steps;

(i) cycling through all possible values of V for each value of W until a minimum memory requirement of the data structure is achieved.

5. The method of claim 4, wherein W is set to 1 and V is incremented by one from an initial value of one to a maximum value of a maximum prefix length.

6. The method of claim 5, wherein W is incremented by 1 and V is incremented by one from an initial value of one to a maximum value of a maximum prefix length.

7. The method of claim 3, further comprising the step of truncating a table having empty cells.

8. A method of creating a forwarding table data structure from a routing table sorted in ascending order, said routing table including a plurality of route entries where each route entry contains a prefix representing an address, a prefix length (PL) and a resource index; said method comprising the steps of:

(a) selecting a width W ($1 \leq W \leq N$) for a first stage table T0, where N is a maximum prefix length;

(b) creating the first stage table T0 of a size equal to $2^W$;

(c) reading a route entry from the routing table;

(d) computing an offset A from the W first bits of the prefix of the route entry read at step (c);

(e) comparing the prefix length PL of the route entry with the width W of the first stage table T0;

(1) creating a resource record when the prefix length PL is equal to the width W, said resource record including the resource index RI of the route entry and an action indicator AI of 0; storing the resource record at the offset A in the first stage table T0; and returning to step (c) until each route entry in the routing table has been read once;

(2) creating a resource record when the prefix length PL is less than the width W, said resource record including the resource index RI of the route entry and an action indicator AI of 0; storing the resource record at the offset A in the first stage table T0 and at $2^{W-PL}-1$ subsequent locations in the first stage table T0 following the offset A; and returning to step (c) until each route entry in the routing table has been read once;

(3) selecting a width V for a second stage table Tx when the prefix length PL is greater than the width W and offset A in the first stage table T0 is empty; creating the second stage table Tx (x=1,2, . . . ) of a size equal to $2^V$; creating a pointer record including a pointer Ptr to the second stage table Tx and an action indicator AI equal to the width V of the second stage table Tx; storing the pointer record at the offset A in the first stage table T0; and computing an offset B from the next V bits of the prefix following the first W bits; proceeding to second stage processing at step (f);

(4) selecting a width V for a second stage table Tx when the prefix length PL is greater than the width W and offset A in the first stage table T0 contains a resource record; creating the second stage table Tx (x=1,2, . . . ) of a size equal to $2^V$; filling the second stage table Tx with the resource record from offset A of the first stage table T0; creating a pointer record including a pointer Ptr to the second stage table Tx and an action indicator AI equal to the width V of the second stage table Tx; storing the pointer record at the offset A in the first stage table T0; and computing an offset B from the next V bits of the prefix following the first W bits; proceeding to second stage processing at step (f); and (5) computing an offset B from the next V bits of the prefix following the first W bits when the prefix length PL is greater than the width W and offset A in the first stage table T0 contains a pointer record; and proceeding to second stage processing at step (f);

(f) comparing a first modified prefix length PL−W of the route entry with the width V of the second stage table Tx;

(1) creating a resource record when the first modified prefix length PL−W is equal to the width V, said resource record including the resource index RI of the route entry and an action indicator AI of 0; storing the resource record at the offset B in the second stage table Tx; and returning to step (c) until each route entry in the routing table has been read once;

(2) creating a resource record when the first modified prefix length PL−W is less than the width V, said resource record including the resource index RI of the route entry and an action indicator AI of 0; storing the resource record at the offset B in the second stage table Tx and at $2^{V-(PL-W)}-1$ subsequent locations in the second stage table Tx following the offset B; and returning to step (c) until each route entry in the routing table has been read once;

(3) selecting a width U for a third stage table Ty when the first modified prefix length PL−W is greater than the width V and offset B in the second stage table Tx is empty; creating the third stage table Ty (y=$x_{max}$+1, $x_{max}$+2, ... ) of a size equal to $2^U$; computing an offset C from the next U bits of the prefix following the first W+V bits; creating a pointer record including a pointer Ptr to the third stage table Ty and an action indicator AI equal to the width U of the third stage table Ty; storing the pointer record at the offset C in the third stage table Ty; and proceeding to third stage processing at step (g);

(4) selecting a width U for a third stage table Ty when the first modified prefix length PL−W is greater than the width V and offset B in the second stage table Tx contains a resource record; creating the third stage table Ty (y=$x_{max}$+1, $x_{max}$+2, ... ) of a size equal to $2^U$; filling the third stage table Ty with the resource record from offset B of the second stage table Tx; computing an offset C from the next U bits of the prefix following the first W+V bits; creating a pointer record including a pointer Ptr to the third stage table Ty and an action indicator AI equal to the width U of the third stage table Ty; storing the pointer record at the offset C in the third stage table Ty; and proceeding to third stage processing at step (g); and (5) computing an offset C from the next U bits of the prefix following the first W+V bits when the first modified prefix length PL−W is greater than the width V and offset B in the second stage table Tx contains a pointer record; and proceeding to third stage processing at step (g); and (g) comparing a second modified prefix length PL−W−V of the route entry with the width U of the third stage table Ty;

(1) creating a resource record when the second modified prefix length PL−W−V is equal to the width U, said resource record including the resource index RI of the route entry and an action indicator AI of 0; storing the resource record at the offset C in the third stage table Ty; and returning to step (c) until each route entry in the routing table has been read once; and (2) creating a resource record when the second modified prefix length PL−W−V is less than the width U, said resource record including the resource index RI of the route entry and an action indicator AI of 0; storing the resource record at the offset C in the third stage table Ty and at $2^{U-(PL-W-V)}-1$ subsequent locations in the third stage table Ty following the offset C; and returning to step (c) until each route entry in the routing table has been read once.

9. The method of claim 8, where U is set a value equal to N−W−V.

10. The method of claim 8, wherein the step of selecting the width U of third stage tables, for given W, V, comprise the steps of:

(i) defining a sub-range as a group of prefixes in the routing table under W+V;

(ii) scanning the sub-range to find a longest prefix PL';

(iii) calculating a value for U as PL'−W−V; and (iv) calculating a memory requirement as MEMrqd(U)=$2^U$.

11. The method of claim 10, wherein the step of selecting the width V of second stage tables, for given W, comprise the steps of:

(i) defining a sub-range as a group of prefixes in the routing table under W;

(ii) scanning the sub-range to find a longest prefix PL';

(iii) initializing V=1, BEST(V)=1, BESTmem=$2^{(PL'-W)}$, where BEST(V) represents a value of V that memory optimizes the data structure, and BESTmem represents a value of memory required for a memory optimized data structure;

(iv) calculating a memory requirement as MEMrqd(V)=$2^V$;

(v) setting V=BEST(V) and MEMrqd(V)=BESTmem when V is equal to PL'−W;

(vi) reading an entry in the sub-range of the routing table when V is not equal to PL'−W;

(vii) calculating the second modified prefix length as PL−W−V;

(viii) returning to step (vi) when PL−U−V is less than two and the end of the sub-range has not been reached;

(ix) processing steps (i)–(iv) of claim 10 to obtain MEMrqd(U) when PL−W−V is not less than two;

(x) calculating MEMrqd=MEMrqd(V)+MEMrqd(U);

(xi) returning to step (vi) when the end of the sub-range has not been reached;

(xii) incrementing the value of V by one and returning to step (iv) when MEMrqd is greater than BESTmem; and (xiii) setting=BEST(V)=V and BESTmem=MEMrqd, incrementing V by one and returning to step (iv) when MEMrqd is not greater than BESTmem.

12. The method of claim 10, wherein the step of selecting the width W of the first stage table, comprises the steps of:

(i) defining a sub-range as the routing table;

(ii) scanning the sub-range to find a longest prefix PL';

(iii) initializing W=1, BEST(W)=1, BESTmem=$2^{PL'}$, where BEST(W) represents a value of W that memory optimizes the data structure, and BESTmem represents a value of memory required for a memory optimized data structure;

(iv) calculating a memory requirement as MEMrqd(W)=$2^W$;

(v) setting W=BEST(W) and MEMrqd(W)=BESTmem when W is equal to PL';

(vi) reading an entry in the sub-range of the routing table when V is not equal to PL';

(vii) calculating the first modified prefix length as PL−W;

(viii) returning to step (vi) when PL−W is less than two and the end of the sub-range has not been reached;

(ix) processing steps (i)–(xiii) of claim 11 to obtain MEMrqd(V) when PL−W is not less than two;

(x) calculating MEMrqd=MEMrqd(W)+MEMrqd(V);

(xi) returning to step (vi) when the end of the sub-range has not been reached;

(xii) incrementing the value of W by one and returning to step (iv) when MEMrqd is greater than BESTmem; and (xiii) setting BEST(W)=W and BESTmem=MEMrqd, incrementing W by one and returning to step (iv) when MEMrqd is not greater than BESTmem.

13. A method of address translation based on the forwarding table data structure created in claim 8, said method comprising the steps of:

(a) addressing the first stage table T0 using a first offset of the address based on the width W of the table T0;

(b) when the first offset of table T0 is a null entry, assigning a default resource to the address;

(c) when the first offset of the table T0 is a resource record, assigning the resource index to the address from the resource record;

(d) when the first offset to table T0 is a pointer record, addressing a second stage table Tx using a second offset of the address based on the action indicator of the pointer record;

(e) when the second offset of table Tx is a null entry, assigning a default resource to the address;

(f) when the second offset of table Tx is a resource record, assigning the resource index to the address from the resource record;

(g) when the second offset of the table Tx is a pointer record, addressing a third stage table Ty using an third offset of the address based on the action indicator of the pointer record;

(h) when the third offset of table Ty is a null entry, assigning a default resource to the address; and (i) when the third offset of table Ty is a resource record, assigning the resource index to the address from the resource record.

* * * * *